United States Patent [19]
Dugan

[11] Patent Number: 5,843,385
[45] Date of Patent: *Dec. 1, 1998

[54] PLATE-TYPE CHEMICAL REACTOR

[75] Inventor: Jeffrey S. Dugan, Asheville, N.C.

[73] Assignee: BASF Corporation, Mt. Olive, N.J.

[*] Notice: The term of this patent shall not extend beyond the expiration date of Pat. No. 5,658,537.

[21] Appl. No.: 831,869

[22] Filed: Apr. 2, 1997

Related U.S. Application Data

[63] Continuation of Ser. No. 503,771, Jul. 18, 1995, Pat. No. 5,658,537.

[51] Int. Cl.[6] ....................................... B01J 8/04
[52] U.S. Cl. .................... 422/191; 165/164; 165/165; 165/166; 165/167; 165/170; 422/198; 422/200; 422/224; 422/236; 423/659; 428/166; 428/178; 428/188
[58] Field of Search ................................. 422/191, 198, 422/200, 224, 236, 129; 165/164, 165, 166, 167, 170; 428/166, 172, 178, 188; 423/659

[56] References Cited

U.S. PATENT DOCUMENTS

| | | | |
|---|---|---|---|
| 3,856,270 | 12/1974 | Hemker | 259/4 |
| 3,881,701 | 5/1975 | Schoenman et al. | 259/4 |
| 5,016,707 | 5/1991 | Nguyen | 165/167 |
| 5,534,328 | 7/1996 | Ashmead et al. | 428/166 |
| 5,595,712 | 1/1997 | Harbster et al. | 422/129 |

FOREIGN PATENT DOCUMENTS

| | | |
|---|---|---|
| 3926466 A1 | 2/1991 | Germany . |
| PCT/US94/ 02845 | 3/1994 | WIPO . |

OTHER PUBLICATIONS

European Search Report EP 96 11 0781 and Abstract.

*Primary Examiner*—Timothy McMahon

[57] ABSTRACT

A plate-type chemical reactor and method of using same to react two or more mutually separated fluid component streams are disclosed, wherein the reactor contains one or more reactor plates including at least one reaction-chamber reactor plate; at least one reaction chamber formed on a front facial surface of the reaction-chamber reactor plate(s); and at least one heat exchange channel passing through the reaction-chamber reactor plate(s) such that at least one section of heat exchange channel(s) is disposed in a heat exchange relationship with the reaction chamber(s); the reaction chamber containing: a plurality of inlet means for receiving and directing a plurality of mutually separated fluid component streams, a first mixing zone for mixing the separated fluid component streams to form a single at least partially reacted multicomponent fluid stream thereof, and at least one outlet means.

32 Claims, 13 Drawing Sheets

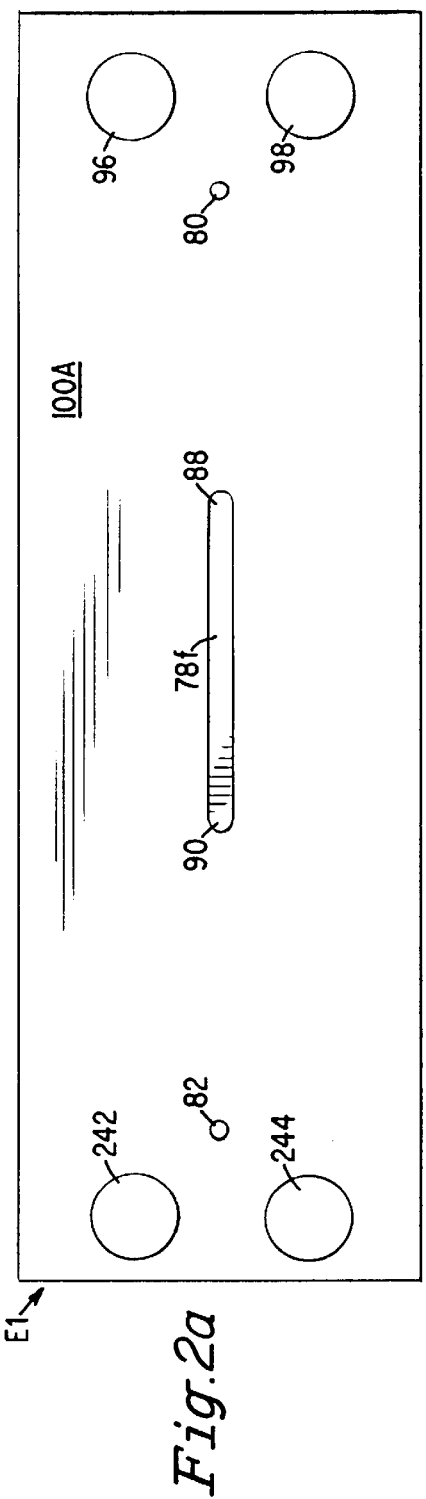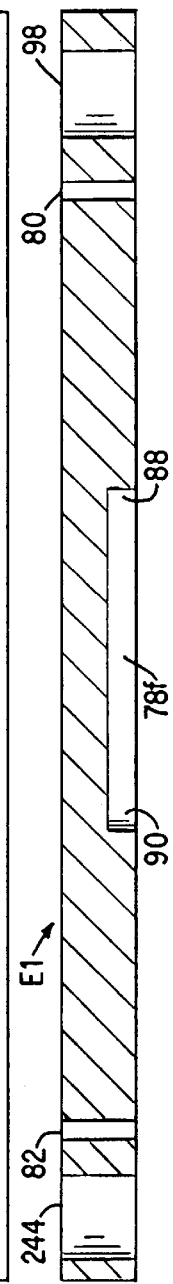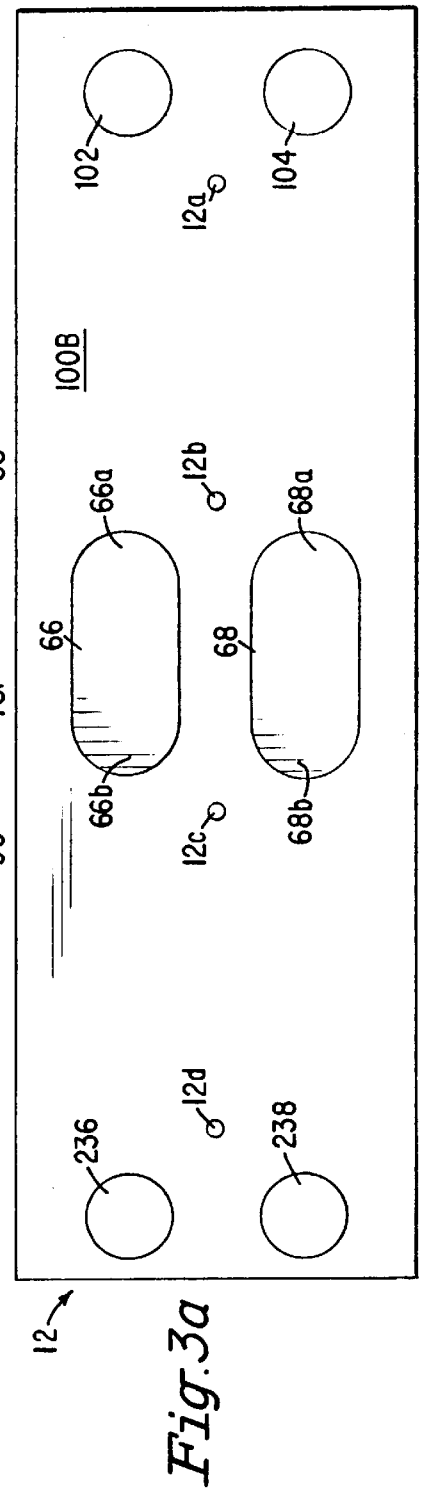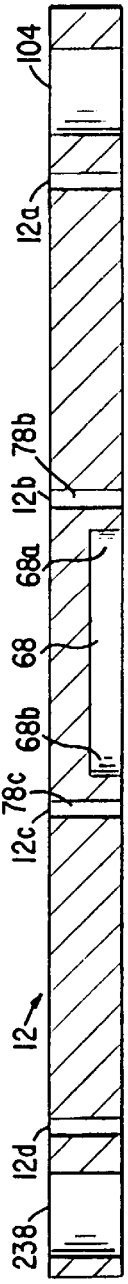

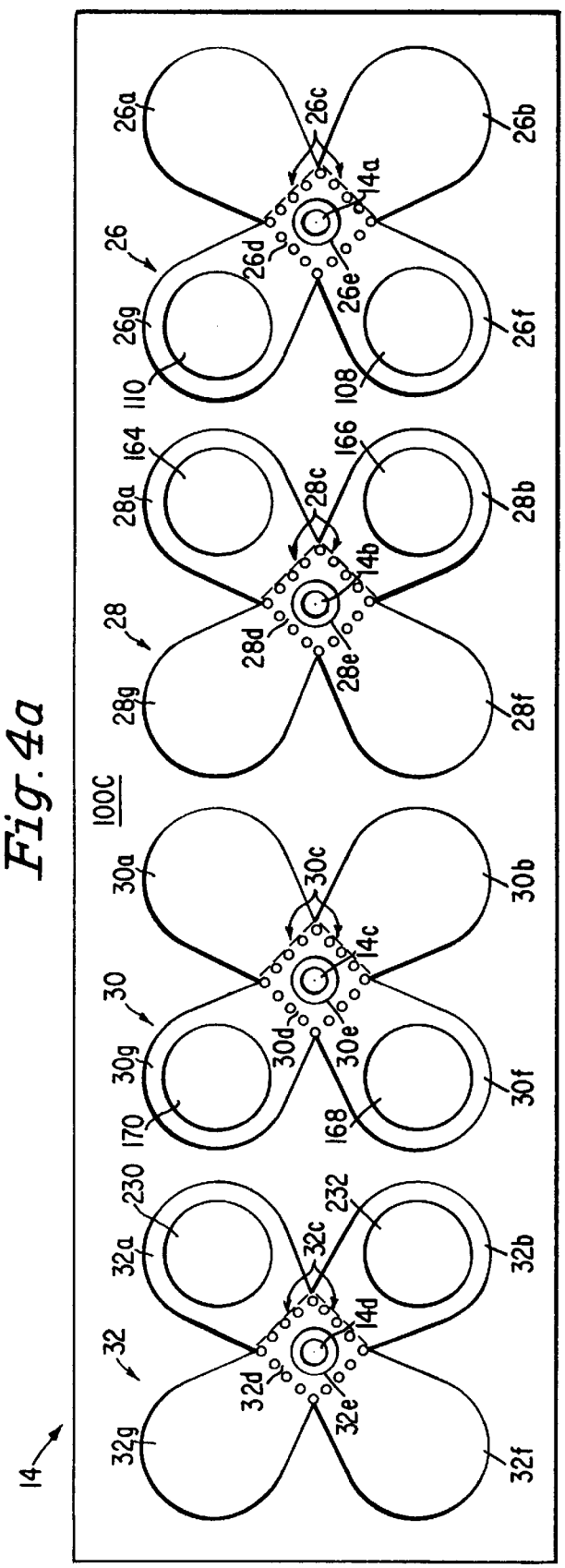

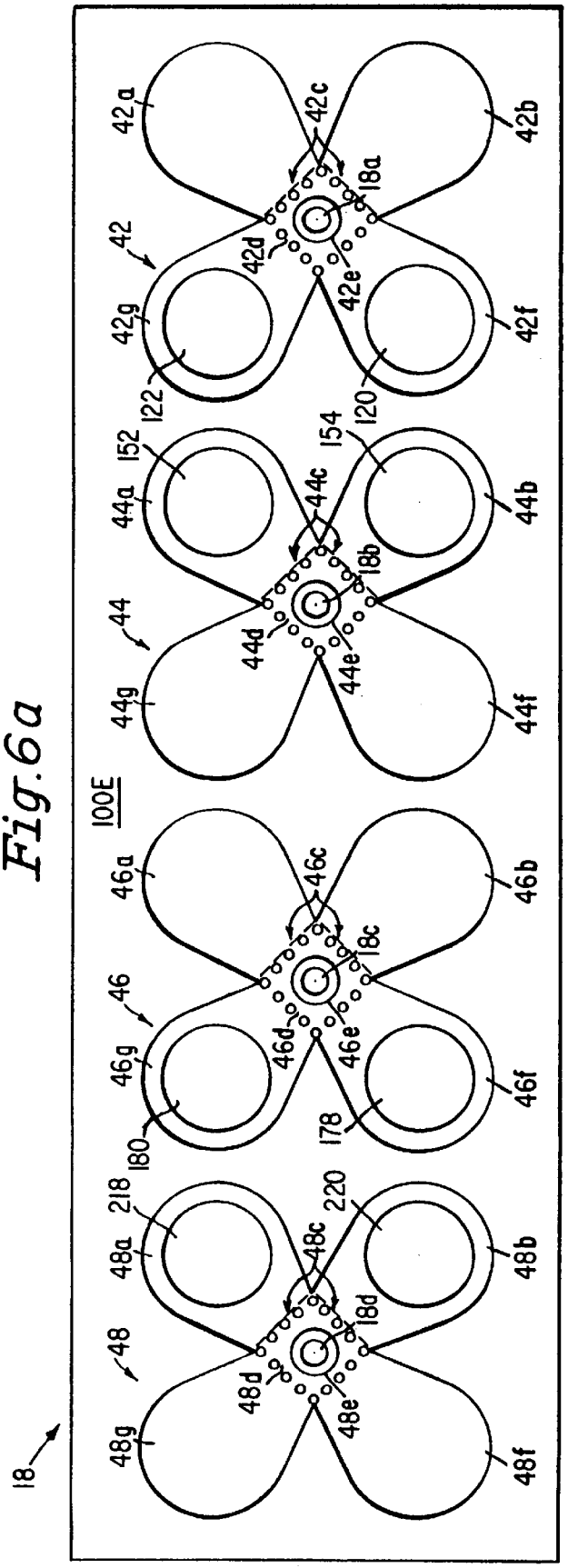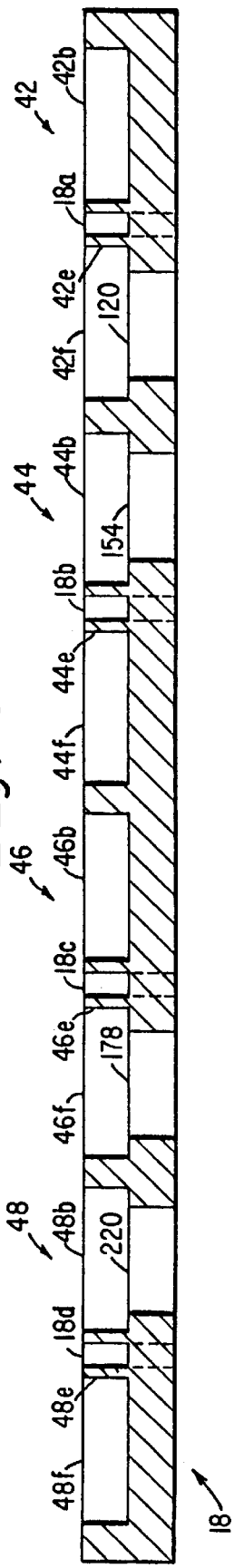

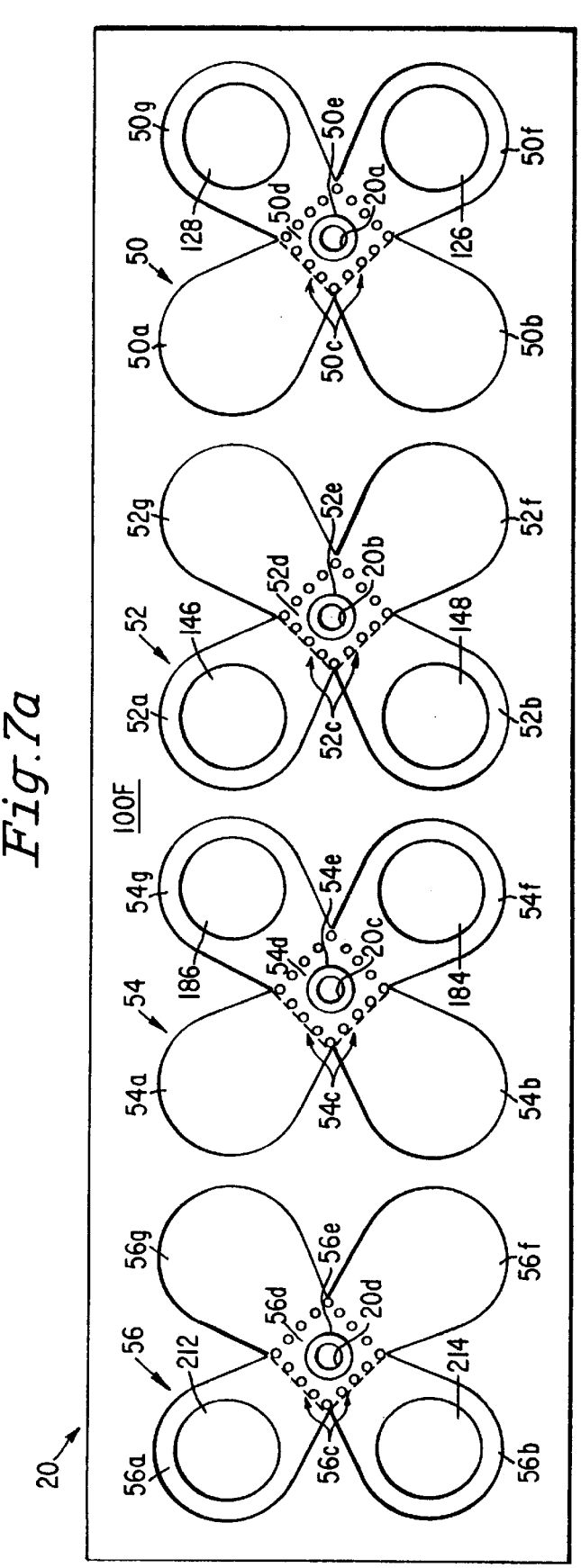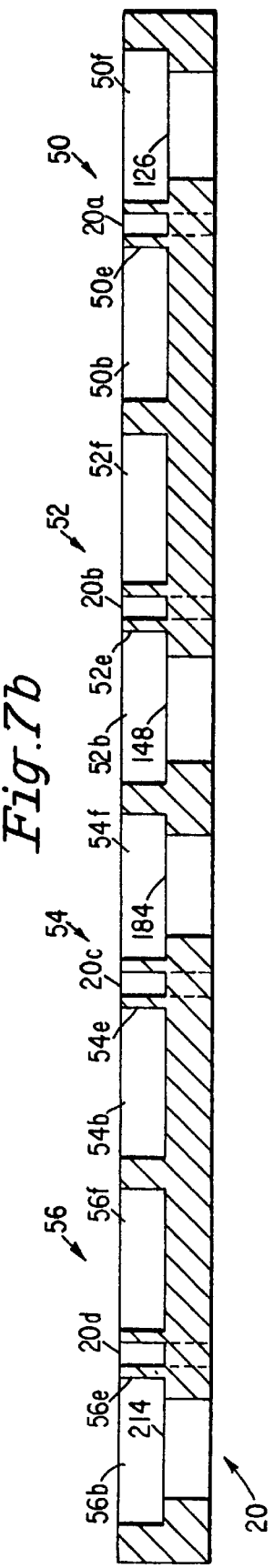

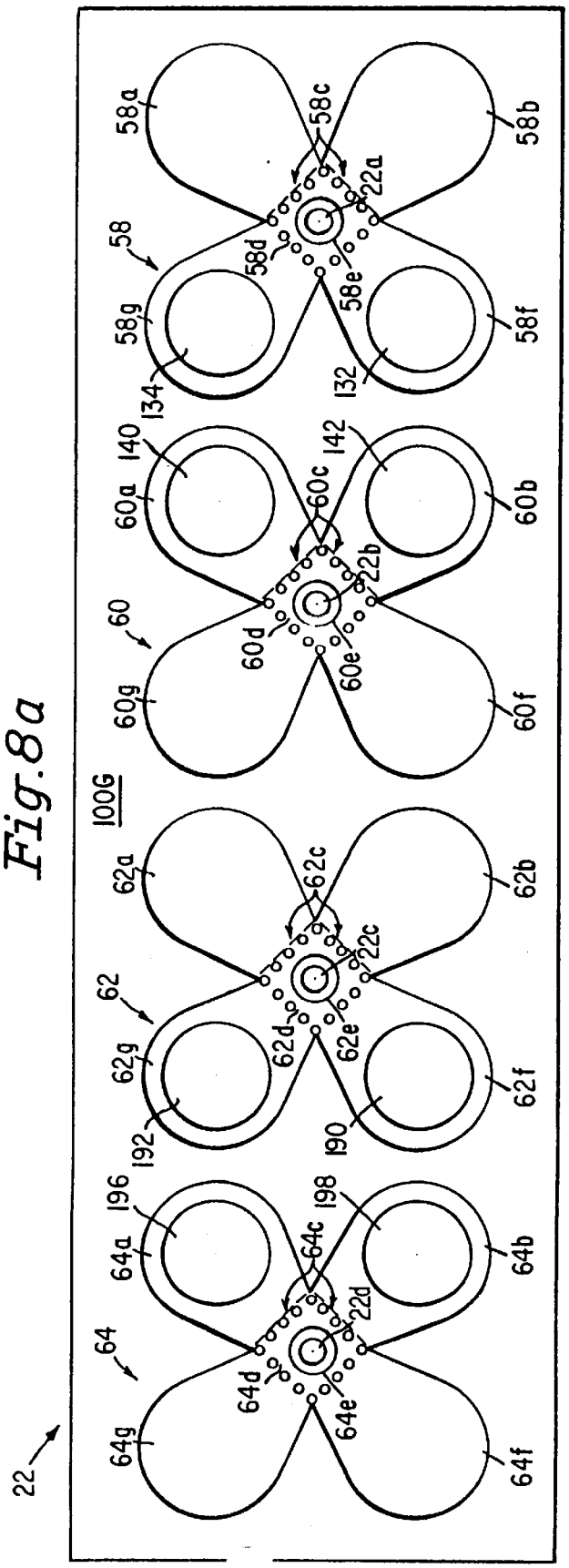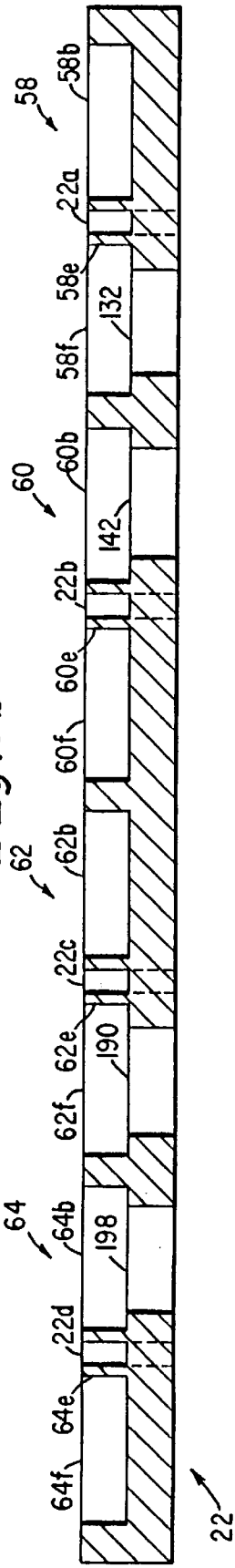
Fig.8a
Fig.8b

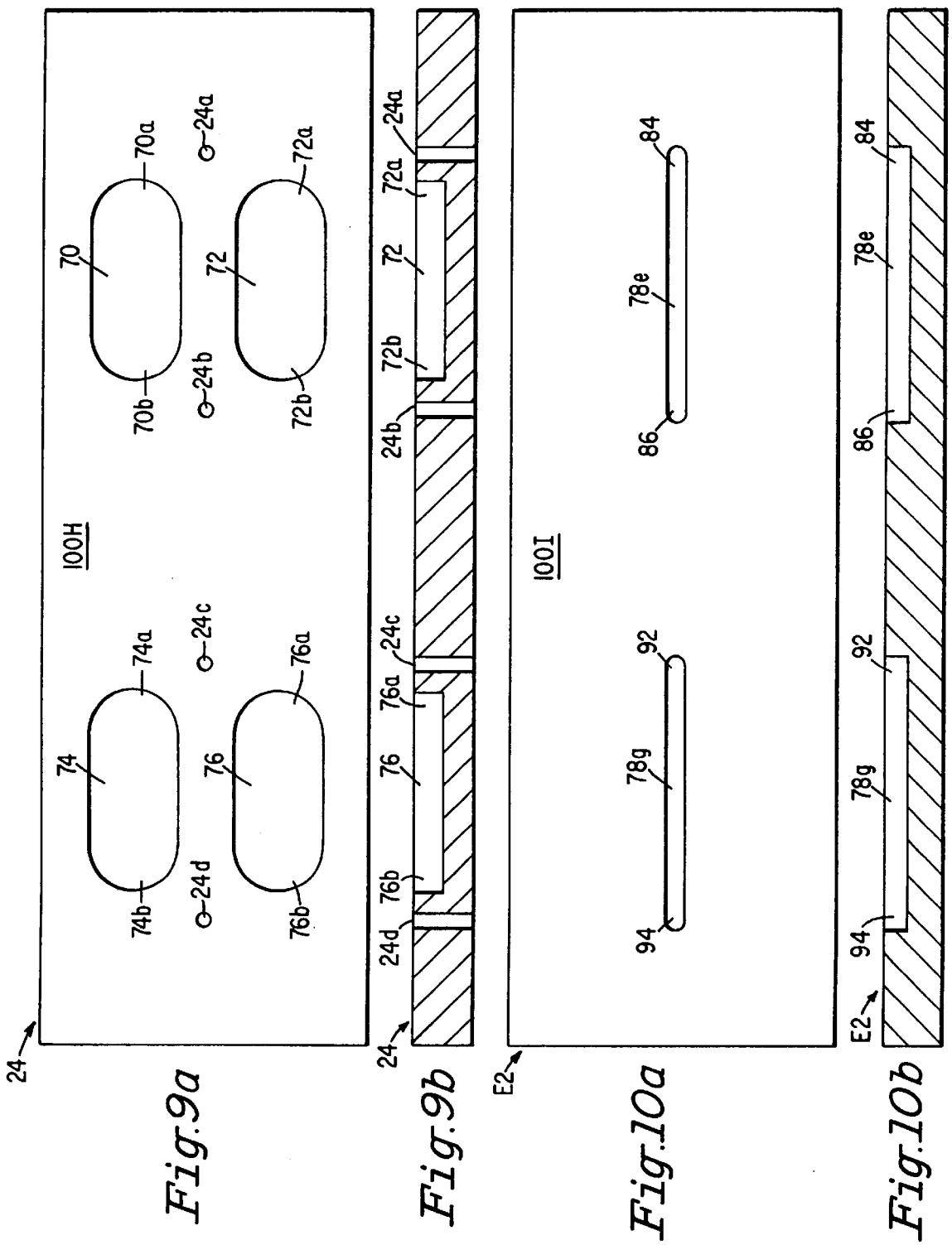

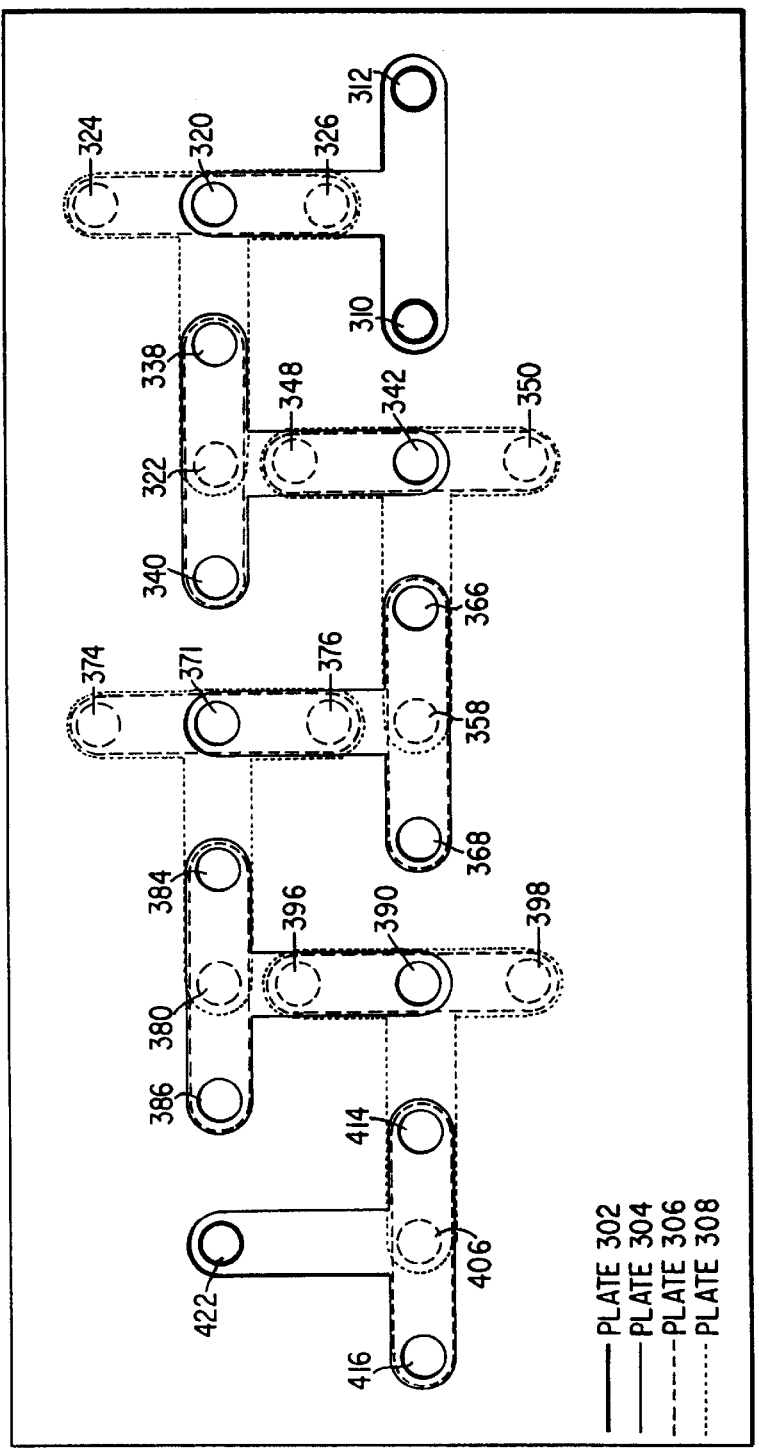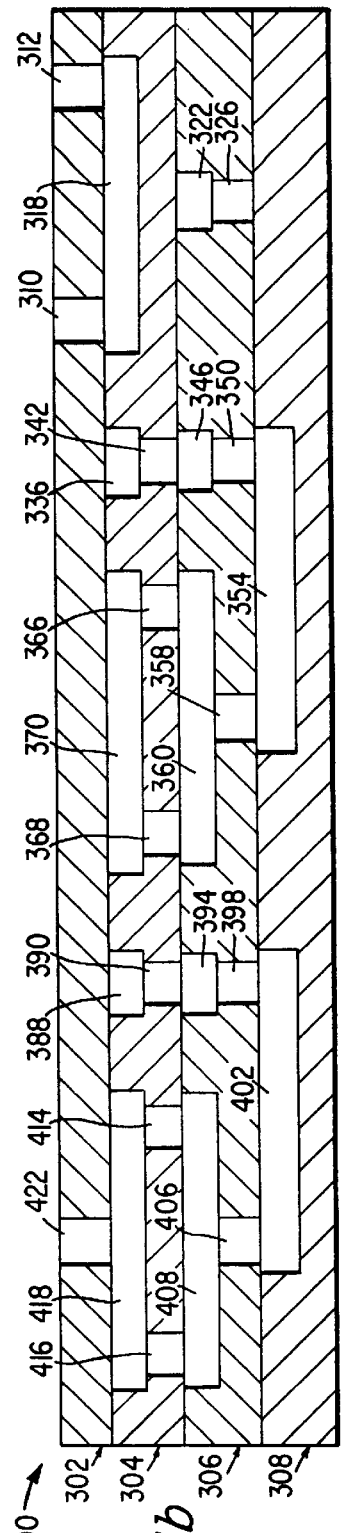
Fig.11a
Fig.11b

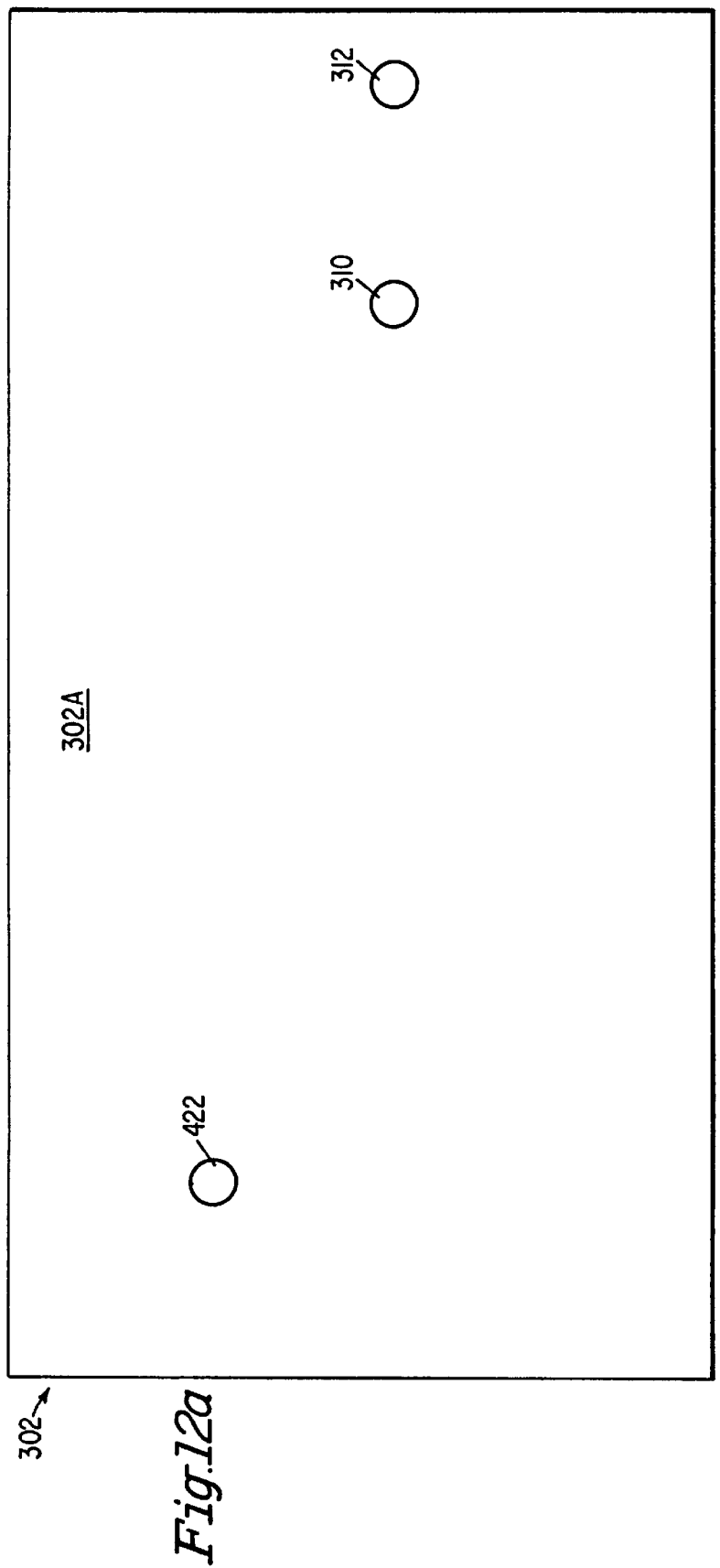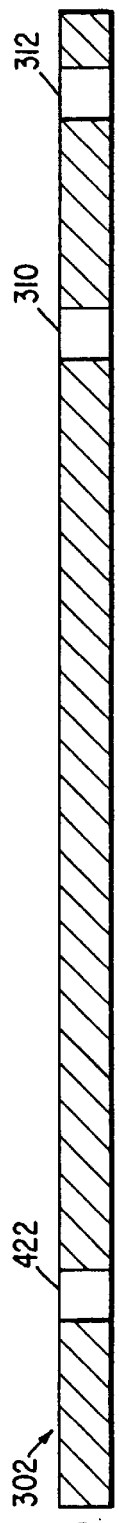
Fig.12a
Fig.12b

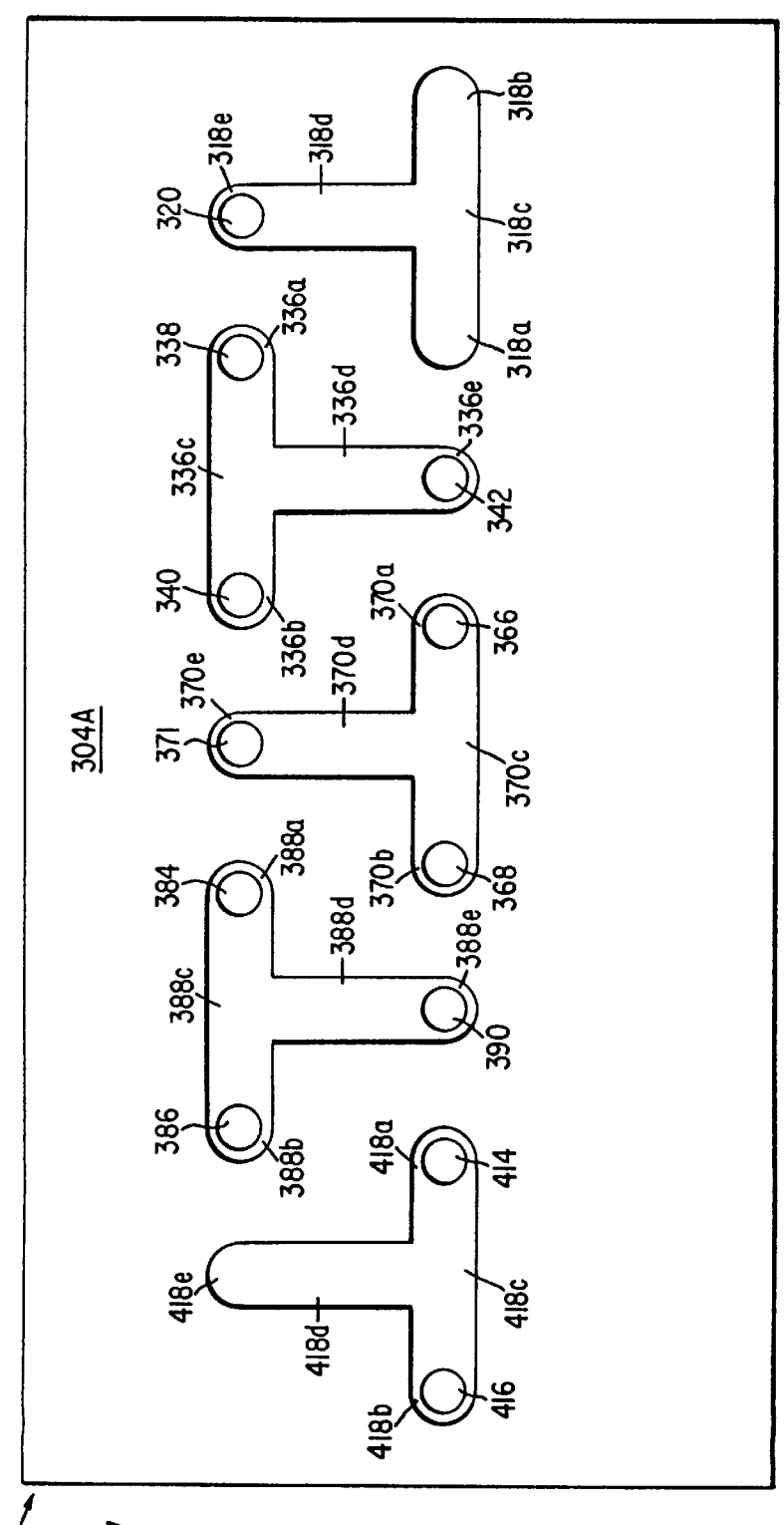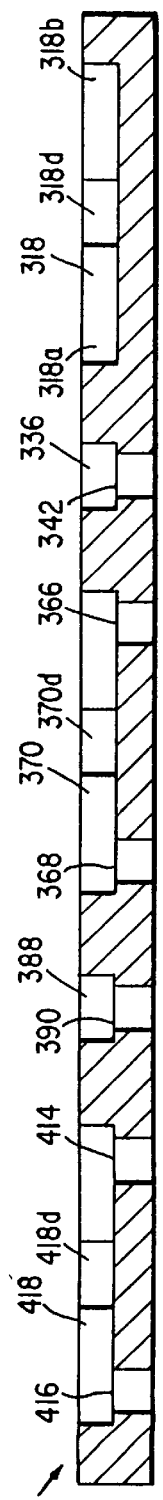
Fig.13a
Fig.13b

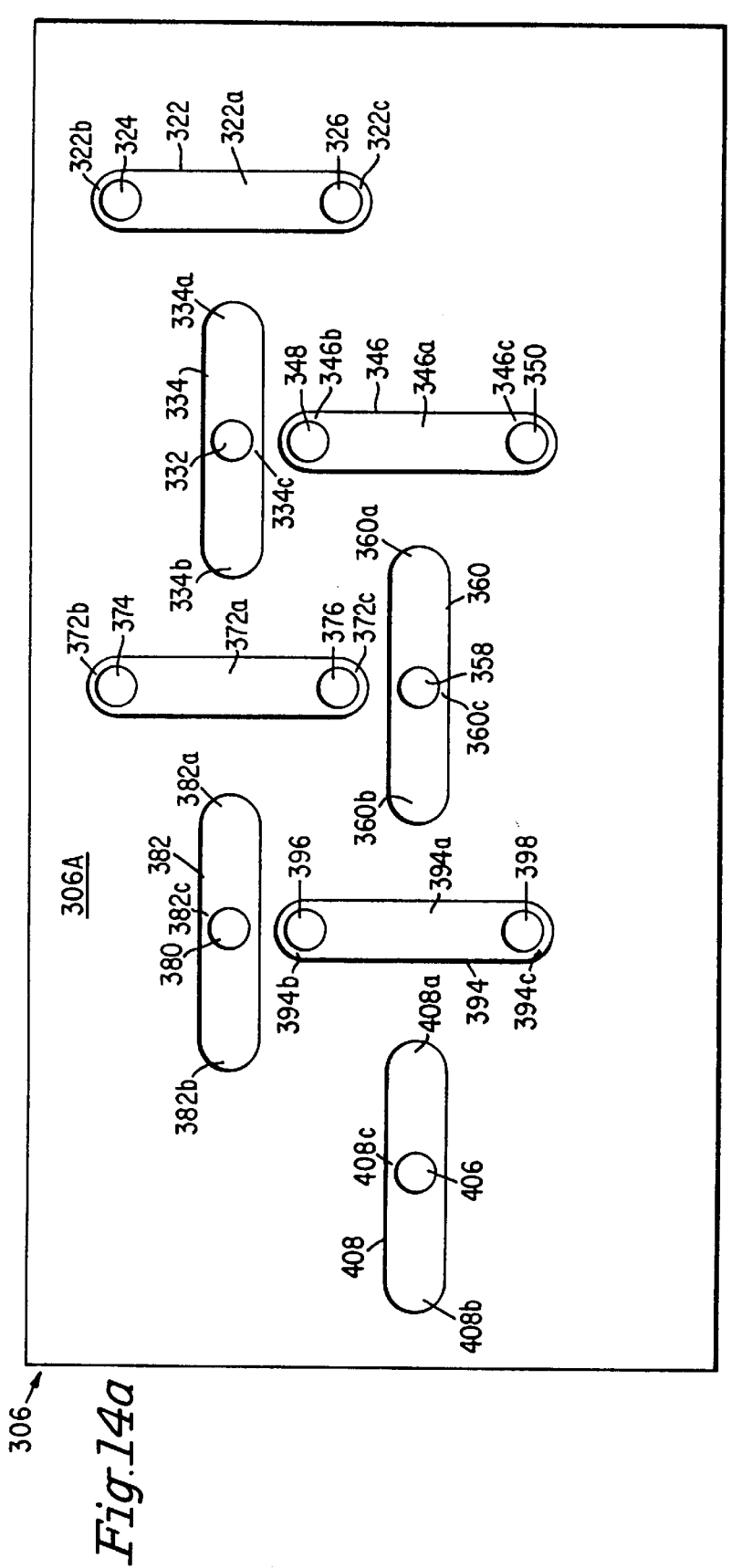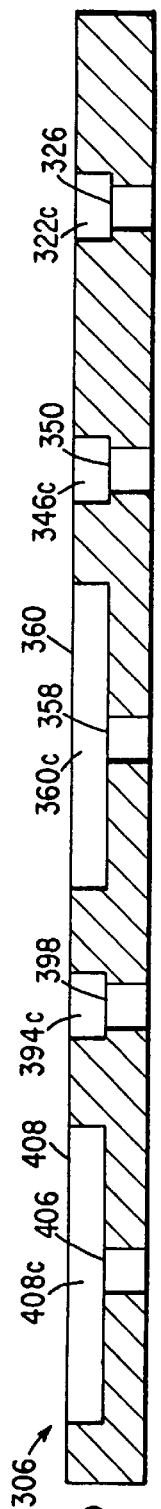
Fig.14a
Fig.14b

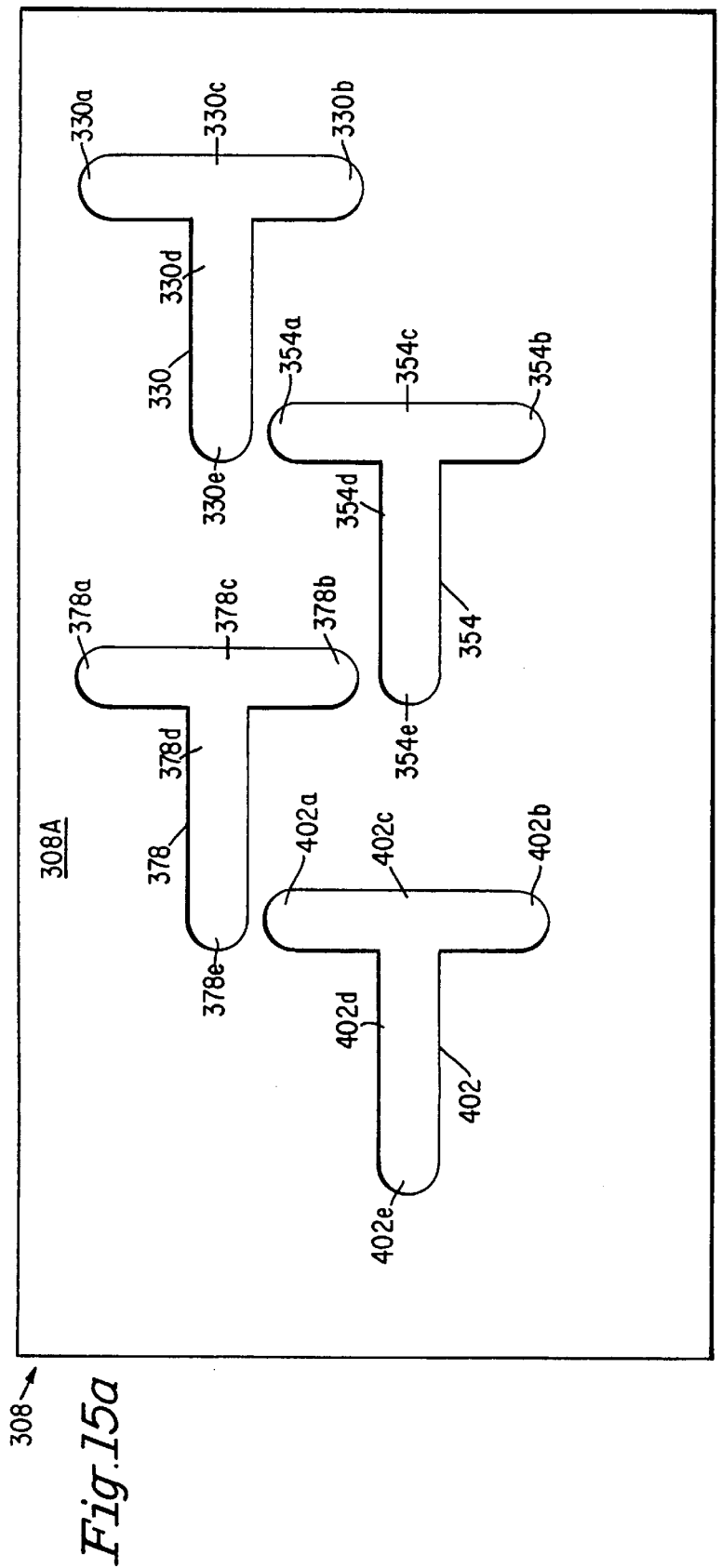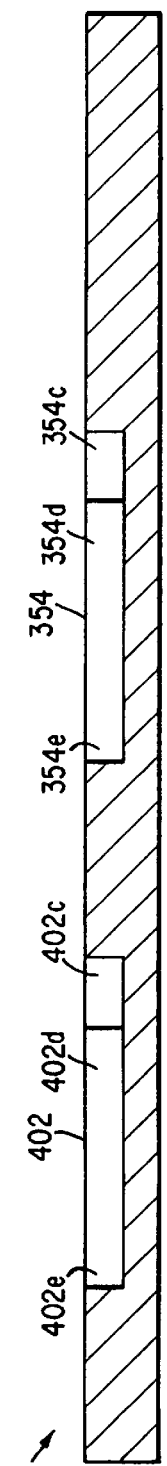

PLATE-TYPE CHEMICAL REACTOR

This application is a continuation of application Ser. No. 503,771, filed Jul. 18, 1995 now U.S. Pat. NO. 5,658,537.

BACKGROUND OF THE INVENTION

This invention relates to a chemical reactor. More particularly, this invention relates to a plate-type chemical reactor for reacting two or more fluid components, wherein the reactor contains both static mixing means and heat exchange means.

Chemical reactors are widely used in industry to carry out reactions between two or more fluid components, for example, between liquids and liquids, gases and gases, slurries and slurries, liquids and gases, liquids and slurries, and gases and slurries.

Many industrial reactors are large, fixed-site units designed for continuous operation at roughly constant throughput. These reactors typically have a conventional shell-and-tube design wherein reactants pass through catalyst-containing tubes while heat, usually in the form of hot gases contained within the shell, is applied to the outside of the tube.

A major drawback to shell-and-tube type reactors in general is the size of these reactors. Their large size makes these reactors less desirable for use in applications requiring a more compact reactor. For such applications, plate-and-frame design reactors tend to be preferred.

Plate-and-frame type reactors provide a more compact overall unit than the conventional shell-and-tube reactors and also provide a high degree of modularity. For these reasons, plate-and-frame reactors tend to be used in industrial applications which require high performance and efficiency with relatively low cost, small volume, and light weight.

Plate-and-frame type reactors are disclosed, for example, in U.S. Pat. Nos. 5,209,906 and 4,933,242.

Despite their relatively compact size, however, many plate-and-frame reactors are still undesirably bulky and expensive to make. This is generally because the plates in these reactors tend to be thick. Such thick plates make these plate-type reactors bulky and, therefore, more expensive to make, inspect, clean, re-use and/or replace. It would be desirable, therefore, to provide less bulky plate-type reactors. Less bulky plate-type reactors can be produced more economically and more efficiently on demand with a variety of different interchangeable structures to satisfy a wide variety of needs.

Many reactions carried out in reactors either generate or absorb heat. Such reactions include, for example, those involving the processing of viscous liquids or the reaction of gaseous or liquid systems in contact with a solid catalyst. In such reactions, it is often vital to maintain the reactants at a closely specified temperature and to remove or add heat during the process depending on whether the reaction is exothermic or endothermic. Inadequate temperature control can lead to undesirable products. For example, in free radical polymerizations, the loss or lack of adequate temperature control can result in products having undesirable molecular weight and, hence, undesirable physical properties. In isothermal reactions, inadequate temperature control may lead to undesired crosslinking, or, where a thermoplastic product is desired, to the formation of undesirable crosslinked gels. In some cases, excessive temperature may cause depolymerization coupled with degradation of the molecular weight.

In many instances, temperature gradients combined with residence time variations can lead to significantly low product yields.

Precise control of reaction conditions can be particularly necessary in reactions carried out in stages. In such reactions, a first stage often requires certain component concentrations, dwell times, and temperatures for optimum results, while subsequent stages require a different set of conditions to most efficiently produce a product having maximum purity.

Therefore, it is desirable to provide a reactor which has means for controlling the temperature and the residence time of the reactants therein, whether the reaction is carried out in a single stage or in multiple stages. Reactors which reportedly have means for controlling temperature are disclosed, for example, in U.S. Pat. Nos. 5,209,906 to Watkins et al.; 4,421,162 to Tollar; and 3,528,783 to Haseldon, all of which are hereby incorporated by reference herein.

It is further desirable that a reactor have means therein for mixing the reactants.

Mixers generally fall into two classes, i.e., continuous mixers and batch mixers. In a continuous mixer, components to be mixed are introduced at a particular flow rate into a mixing chamber where the components are mixed by means of mechanical stirring and/or the action of the velocity and turbulence of the components. Unfortunately, continuous mixers do not always provide sufficient contact between molecules of the components to effect complete mixing thereof. If the object of the mixing is to react the components, excess reagent is often required to compensate for the inefficiency of the mixing and to achieve as much contact between the molecules of the components as possible. Thus, the inefficiency of continuous mixers results in additional costs associated with the use of excess reagent as well as the use of energy to operate the mixer.

In a batch mixer, a plurality of components to be mixed are placed in a container and mixed together by means of stirring, rotation, tumbling or the like. Batch mixers also have drawbacks. For example, batch mixing is relatively slow since the process involves feeding the components into the mixing chamber, mixing the components for a period of time sufficient to mix the entire volume of components, and then removing the mixture from the mixing chamber. In addition, batch mixers are typically large structures since an entire batch is mixed at one time. Furthermore, batch mixers tend to operate inefficiently.

It is desirable, therefore, to provide a reactor which itself contains a mixing means so as to efficiently and thoroughly mix together a plurality of components. It is further desirable that such a mixing means be completely static in operation and include no moving parts. In addition, it is desirable that such a mixing means be flexible enough to accommodate a variety of specific needs and system configurations. Furthermore, it is desirable that the reactor provide temperature control at the region therein where mixing takes place.

Static mixers are well known mixing devices which generally contain no moving parts. Mixing is achieved in static mixers by directing a moving stream against stationary elements which twist and cut the stream or force the stream through channels or tubes. The multiple subdividing and recombining of a stream in the static mixer homogenizes the stream. Static mixers may also be used to mix together two diverse fluids or to blend together various components broken down from a single fluid. For example, raw milk containing large globules of butter fat is frequently homogenized into a uniform and consistent product by means of a static mixer.

It is desirable, therefore, that the mixing means in the reactor be composed of a static mixer.

A primary object of the present invention is to provide a reactor containing means therein for controlling temperature of the components to be reacted.

Another object of the present invention is to provide a reactor containing means therein for mixing the components.

A further object of the present invention is to provide a reactor which is capable of mixing components therein at a point where temperature is best controlled.

A further object of the present invention is to provide a reactor containing means therein for controlling temperature in said mixing means.

Another object of this invention is to provide a reactor having means for controlling the degree of mixing of the components.

A still further object of the present invention is to provide a reactor having means therein for controlling the residence time of the components in the reactor.

Another object of this invention is to provide a reactor having means for controlling the degree of mixing of the components.

An additional object of this invention is to provide a reactor having means for controlling residence time of the components, temperature of the components, and degree of mixing in stages.

Another object of the present invention is to provide a reactor which is less bulky and less expensive to make, clean, inspect, re-use and replace than prior reactors.

A still further object of this invention is to provide a method of reacting two or more components by means of a reactor having the characteristics set forth in one or more of the foregoing objects.

These and other objects which are achieved according to the present invention can be discerned from the following description.

SUMMARY OF THE INVENTION

The present invention provides a plate-type chemical reactor for reacting two or more mutually separated fluid component streams, containing one or more reactor plates including at least one reaction-chamber reactor plate; at least one reaction chamber formed on a front facial surface of the reaction-chamber reactor plate(s); and at least one heat exchange channel passing through the reaction-chamber reactor plate(s) such that at least one section of heat exchange channel(s) is disposed in a heat exchange relationship with the reaction chamber(s); the reaction chamber containing: a plurality of inlet means for receiving and directing a plurality of mutually separated fluid component streams, a first mixing zone for mixing the separated fluid component streams to form a single at least partially reacted multicomponent fluid stream thereof, and at least one outlet means.

In preferred embodiments, the reactor of this invention further contains at least one turbulence-inducing zone upstream of the first mixing zone and at least one flow-splitting means disposed downstream of the first mixing zone.

The turbulence-inducing zone is adapted to induce turbulence in the fluid component streams before or during mixing thereof into the at least partially reacted multicomponent fluid stream. The turbulence-inducing zone may be formed by any conventional means such as, e.g., baffles. Preferably, the turbulence-inducing zone is formed by means of the configuration of the reaction chamber itself. For example, in FIGS. 1–10 herein, the narrowing of the X-shaped reaction chamber at or just prior to the first mixing zone thereof causes a stream passing through the narrowed portion to increase in velocity and in turbulence.

The flow-splitting means is adapted to divide the at least partially reacted multicomponent stream into a plurality of at least partially reacted multicomponent substreams which can then be recombined and re-divided a desired number of time to ensure thorough mixing of the components. The reaction chamber(s) preferably has an X-shaped configuration or a T-shaped configuration.

The present invention is also directed to a method of reacting two or more fluid component streams by means of the reactor of this invention.

A primary advantage of the reactor of this invention is that a plurality of first mixing zones, turbulence-inducing zones, flow-splitting channels and reaction chambers can be formed at relatively low expense if these flow paths are formed by etching and the reactor plate(s) is relatively thin.

In addition, the reactor of this invention provides greater control over temperature, residence time, and degree of mixing therein.

BRIEF DESCRIPTION OF THE DRAWINGS

FIGS. 2a and 2b represent, respectively, a top view and a longitudinal cross-sectional side view of a first end-plate disposed in the reactor shown in FIG. 1.

FIGS. 3a and 3b represent, respectively, a top view and a longitudinal cross-sectional side view of a first reactor plate disposed in the reactor shown in FIG. 1.

FIGS. 4a and 4b represent, respectively, a top view and a longitudinal cross-sectional side view of a second reactor plate disposed in the reactor shown in FIG. 1.

FIGS. 6a and 6b represent, respectively, a top view and a longitudinal cross-sectional side view of a fourth reactor plate disposed in the reactor shown in FIG. 1.

FIGS. 7a and 7b represent, respectively, a top view and a longitudinal cross-sectional side view of a fifth reactor plate disposed in the reactor shown in FIG. 1.

FIGS. 8a and 8b represent, respectively, a top view and a longitudinal cross-sectional side view of a sixth reactor plate disposed in the reactor shown in FIG. 1.

FIGS. 9a and 9b represent, respectively, a top view and a longitudinal cross-sectional side view of a seventh reactor plate disposed in the reactor shown in FIG. 1.

FIGS. 10a and 10b represent, respectively, a top view and a longitudinal cross-sectional side view of a second end-plate disposed in the reactor shown in FIG. 1.

FIGS. 11a and 11b respectively represent top and longitudinal cross-sectional side views of a stack of reactor plates which can be used in a second embodiment of a reactor within the scope of this invention.

FIGS. 12a and 12b respectively represent top and longitudinal cross-sectional side views of a first reactor plate present in the stack of reactor plates shown in FIGS. 11a and 11b.

FIGS. 13a and 13b respectively represent top and longitudinal cross-sectional side views of a second reactor plate present in the stack of reactor plates shown in FIGS. 11a and 11b.

FIGS. 14a and 14b respectively represent top and longitudinal cross-sectional side views of a third reactor plate present in the stack of reactor plates shown in FIGS. 11a and 11b.

FIGS. 15a and 15b respectively represent top and longitudinal cross-sectional side views of a fourth reactor plate present in the stack of reactor plates shown in FIGS. 11a and 11b.

DETAILED DESCRIPTION OF THE INVENTION

Figure 1:
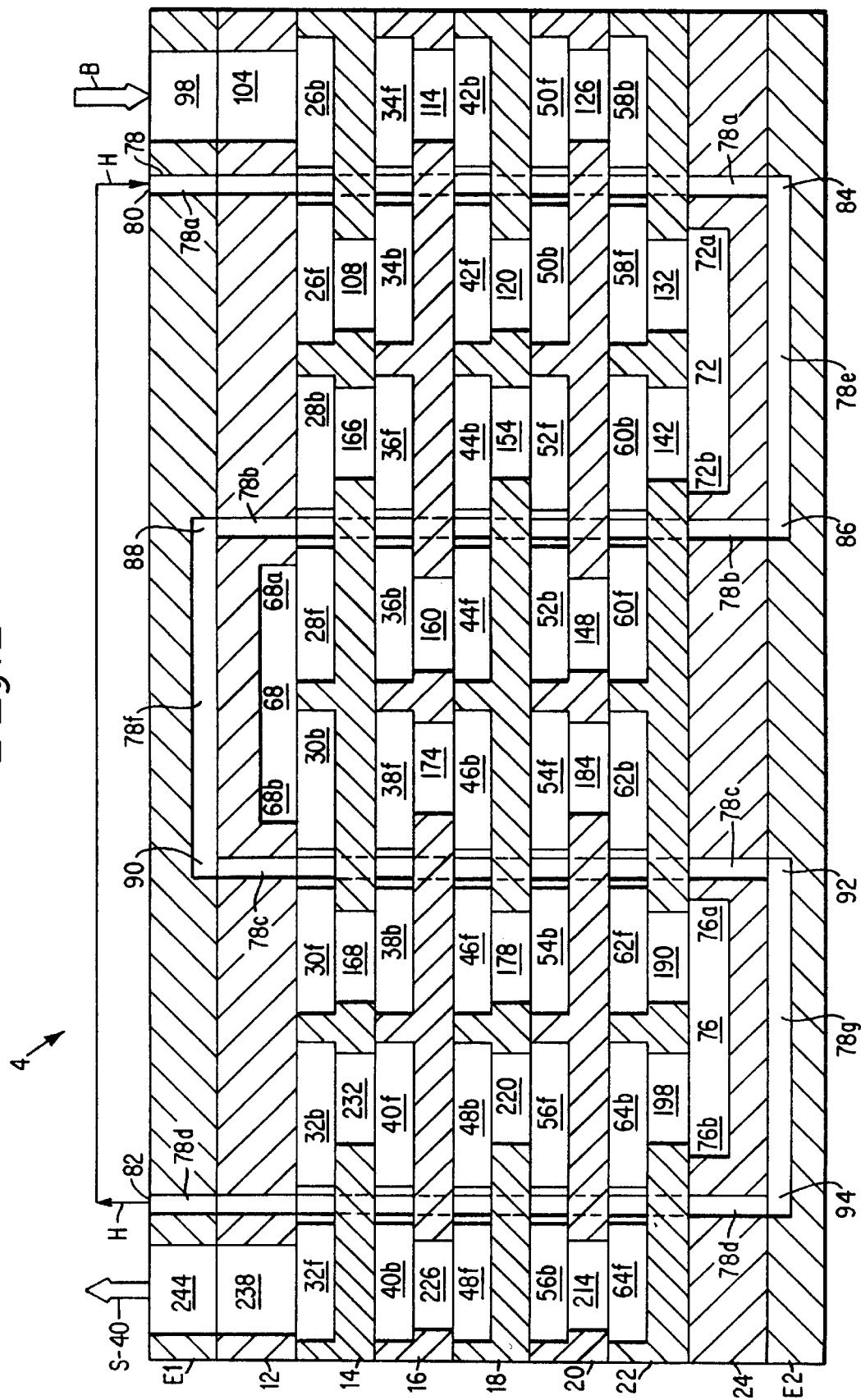
FIG. 1 is a schematic illustration of a cross-sectional side view of a first embodiment of a reactor within the scope of the present invention, wherein the reactor is composed of two end-plates and a stack of reactor plates disposed between the two end-plates.
Figure 5A:
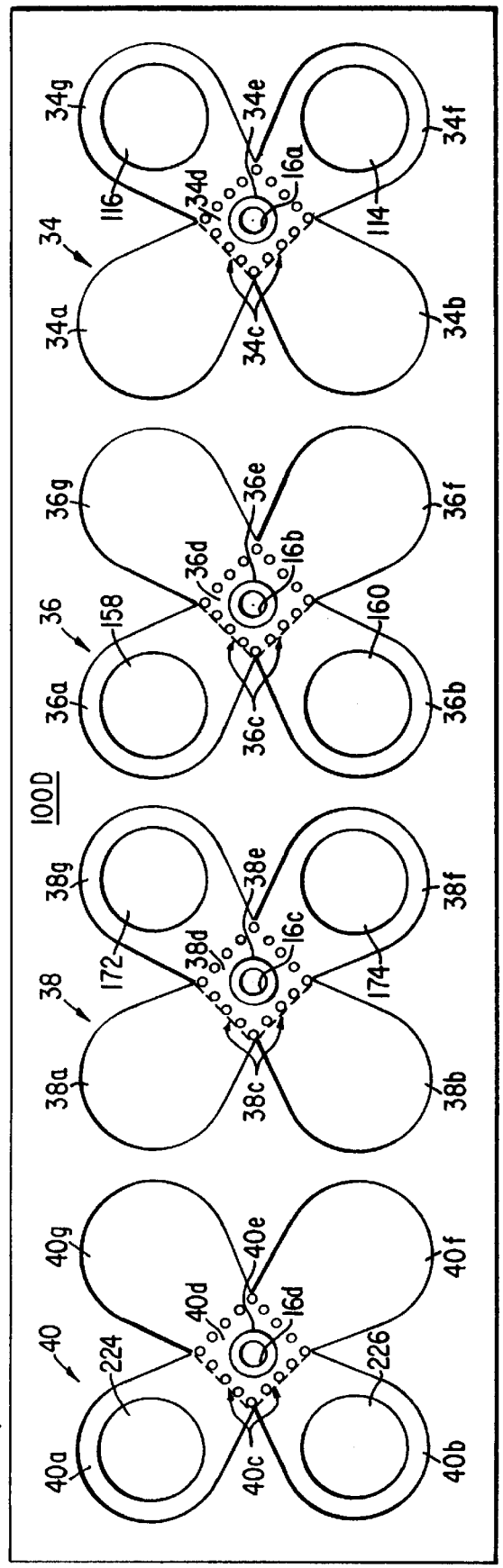
FIGS. 5a and 5b represent, respectively, a top view and a longitudinal cross-sectional side view of a third reactor plate disposed in the reactor shown in FIG. 1.
Figure 5B:
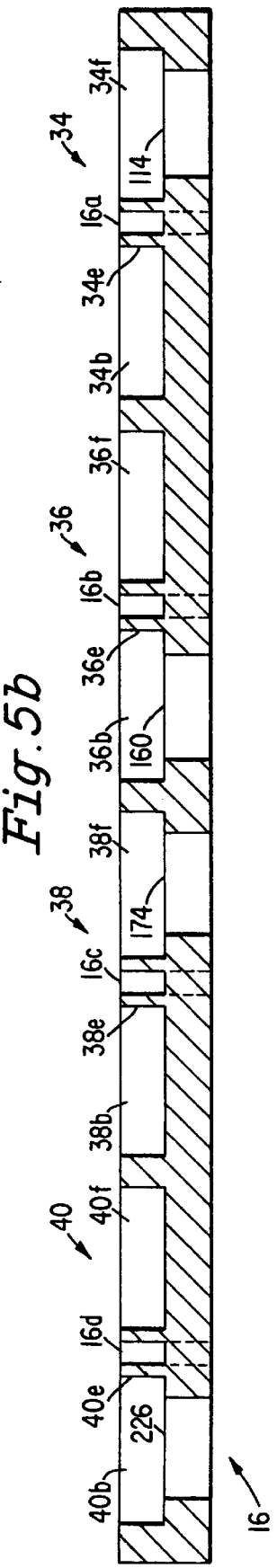

In the reactor of this invention, at least two fluid component streams are mixed together on a common facial surface of a reactor plate in the reactor while simultaneously undergoing heat exchange with at least one heat exchange fluid present in the reactor. Thus, in the reactor of this invention, mixing and heat exchange take place simultaneously on a common facial surface of a reactor plate therein.

The reactor of this invention is composed of one or more reactor plates including at least one reaction-chamber reactor plate, and at least one heat exchange channel passing through the at least one reaction-chamber reactor plate. In preferred embodiments, the reactor of this invention contains a plurality of reactor plates, wherein the plates are stacked in a front-to-back facial configuration. In more preferred embodiments, the plurality of reactor plates are stacked between first and second end-plates.

In the reactor of this invention, each reactor plate will contain at least one "reaction chamber" and/or at least one "flow-separation chamber". The term "reaction chamber" as used herein refers to a chamber wherein multiple components undergo reaction with one another. The term "flow-separation chamber" as used herein refers to a chamber wherein the at least partially reacted multicomponent fluid stream is split into a plurality of at least partially reacted multicomponent fluid substreams.

In the reactor of this invention, at least one reactor plate is a "reaction-chamber reactor plate". The term "reaction-chamber reactor plate" as used herein refers to a reactor plate which has formed on a front facial surface thereof at least one reaction chamber. A reaction-chamber reactor plate may contain only reaction chambers or may further contain one or more flow-separation chambers. In some preferred embodiments, the reactor of this invention will be further composed of at least one "flow-separation reactor plate". As used herein, the term "flow-separation reactor plate" refers to a reactor plate having formed on a front facial surface thereof at least one flow-separation chamber. A flow-separation reactor plate may contain only flow-separation chambers or may further contain one or more reaction chambers. If a reactor plate contains both a reaction chamber and a flow-separation chamber, the plate will be referred to herein as a "reaction-chamber reactor plate" if the most upstream chamber therein is a reaction chamber. If the most upstream chamber is a flow-separation chamber, the plate will be referred to herein as a "flow-separation reactor plate".

In one preferred embodiment of the reactor of this invention, each reactor plate is a reaction-chamber reactor plate. This embodiment is illustrated herein, e.g., in FIGS. 1–10.

In another preferred embodiment of the reactor of this invention, the reactor plates will include at least one, preferably multiple, reaction-chamber reactor plates and at least one, preferably multiple, flow-separation reactor plates, wherein each flow-separation reactor plate separates two reaction-chamber reactor plates. This embodiment is illustrated, for example, in FIGS. 11–15 herein.

The reaction chamber contains a plurality of inlet means for receiving and directing a plurality of mutually separated fluid component streams, a first mixing zone for combining the separated fluid component streams to form a single at least partially reacted multicomponent fluid stream thereof, and at least one outlet means.

In preferred embodiments of this invention, the reactor will be composed of a plurality of the reaction chambers, wherein the reaction chambers will be serially joined. The reaction chambers may all be formed in a single reactor plate or may be distributed in a plurality of reactor plates. In one particularly preferred embodiment, the reactor of this invention will be composed of a plurality of reaction-chamber reactor plates, arranged in a front-to-back facially-stacked configuration, wherein each reaction-chamber reactor plate has formed on a front facial surface thereof a plurality of reaction chambers.

When a plurality of reaction chambers are used, the chambers are preferably serially joined, i.e., each reaction chamber, other than the first reaction chamber in the series, is disposed in fluid communication with a preceding (i.e., upstream) reaction chamber in the series; and each reaction chamber, other than the last reaction chamber in the series, is disposed in fluid communication with a subsequent (i.e., downstream) reaction chamber.

Preferably, the plurality of inlet means in the reaction chamber(s) is disposed to receive the mutually separated fluid component streams in a primary direction and to direct the streams in directions substantially normal to the primary direction. As used herein, the term "primary direction" refers to a direction which is substantially normal to and toward the front facial surface(s) of the reactor plate(s).

In preferred embodiments of the reactor of this invention, the reaction chamber(s) further contains a turbulence-inducing zone for inducing turbulence in the separated fluid component streams before or during the mixing of the streams in the first mixing zone. The turbulence-inducing zone is preferably disposed downstream of and in fluid communication with the inlet means and upstream of and in fluid communication with the first mixing zone.

The first mixing zone is disposed downstream of and in fluid communication with the plurality of inlet means. The first mixing zone is adapted to combine the separated fluid component streams to form a single at least partially reacted multicomponent fluid stream thereof. In preferred embodiments of the reactor of this invention, at least one section of the heat exchange channel(s) is disposed in a heat exchange relationship with the first mixing zone. The heat exchange relationship between the first mixing zone and the section(s) of the heat exchange channel(s) allows mixing and heat exchange to occur on a common facial surface of the reactor plate.

In preferred embodiments of the reactor of this invention, the reactor further comprises a flow-splitting means for splitting the single at least partially reacted multicomponent fluid stream formed in the first mixing zone of the reaction chamber(s) into a plurality of at least partially reacted multicomponent fluid substreams. The flow-splitting means may be disposed in the reaction chamber(s) itself or in a separate flow-separation chamber formed in said reaction-chamber reactor plate or in a separate flow-separation reactor plate. The flow-splitting means can be composed of any physical barrier or flow-splitter conventionally used to divide a stream into substreams.

In one particularly preferred embodiment, the flow-splitting means will be located in the reaction chamber itself, wherein the flow-splitting means will be disposed downstream of and in fluid communication with the first mixing zone. This embodiment is shown, e.g., in FIGS. 1–10 herein.

In another particularly preferred embodiment, mentioned previously herein, the flow-splitting means will be disposed in a separate flow-separation chamber, preferably formed in a separate reactor plate disposed adjacent to the reaction-chamber reactor plate(s). Preferably, each flow-separation reactor plate will be disposed between two reaction-chamber reactor plates. Preferably, when the flow-splitting means is disposed in a separate flow-separation chamber, each reaction-chamber reactor plate will contain a plurality of reaction chambers and each flow-separation reactor plate will contain a plurality of flow-separation chambers, wherein, more preferably, the reaction chambers and the flow-separation chambers are arranged as a series. In such a series, each flow-separation chamber is disposed between and in fluid communication with two reaction chambers. This embodiment is illustrated, for example, in FIGS. 11–15 herein.

The number of outlet means will depend on whether the reaction chamber(s) contains a flow-splitting means disposed therein. If the reaction chamber(s) does not contain a flow-splitting means, the chamber(s) will generally have a single outlet means through which the single at least partially reacted multicomponent fluid stream exits the chamber. On the other hand, if the reaction chamber contains a flow-splitting means, the chamber(s) will preferably have a plurality of outlet means, wherein each of the outlet means is disposed to receive one of the at least partially reacted multicomponent fluid substreams.

The flow-splitting means is disposed to receive the single at least partially reacted multicomponent fluid stream formed in the first mixing zone of the reaction chamber(s) and to split the stream into a plurality of mutually separated at least partially reacted multicomponent fluid substreams.

The flow-splitting means may be disposed in the reaction chamber itself or in a separate flow-separation chamber disposed in fluid communication with the reaction chamber. If the flow-splitting means is located in the reaction chamber, the flow-splitting means is generally disposed downstream of the first mixing zone and upstream of the outlet means. The flow-splitting means is preferably adapted to split the single at least partially reacted multicomponent fluid stream in the second direction, i.e., a direction which is substantially normal to the first direction in which the separated streams are received by the inlet means of the reaction chamber.

In another embodiment of the reactor of this invention, the at least one flow-splitting means is located in at least one separate flow-separation chamber which is disposed in fluid communication with the reaction chamber. The flow-separation chamber(s) is formed in a front facial surface of at least one second reactor plate. Preferably, the flow-separation chamber is disposed to receive the single multicomponent fluid stream in the first direction from the outlet means of the reaction chamber.

If the flow-splitting means is disposed in the reaction chamber, the reaction chamber(s) may further contain at least one second mixing zone which is in fluid communication with and downstream of the flow-splitting means. The second mixing zone is preferably disposed in a heat exchange relationship with a second section of the heat exchange channel(s) or with a second heat exchange channel. A second turbulence-inducing zone can be disposed upstream of and in fluid communication with the second mixing zone to ensure more thorough mixing therein.

The heat exchange channel(s) extends through the first reactor plate or plates and at least one section thereof is disposed in a heat exchange relationship with the reaction chamber(s). Preferably, the section of the heat exchange channel which is disposed in a heat exchange relationship with the reaction chamber(s) will be disposed in a heat exchange relationship with the first mixing zone of the reaction chamber. This section of the heat exchange channel will be disposed either downstream of the first mixing zone or within the first mixing zone. Preferably, the heat exchange channel section will transverse the first mixing zone by means of a port or through-hole formed in the first mixing zone.

The first mixing zone is disposed downstream of and in fluid communication with the plurality of inlet means. The first mixing zone is adapted to combine the separated fluid component streams to form a single at least partially reacted multicomponent fluid stream thereof. In preferred embodiments of the reactor of this invention, the heat exchange channel(s) is disposed in a heat exchange relationship with the first mixing zone. Most preferably, the heat exchange channel(s) transverses the mixing region as shown, e.g., in FIGS. 1–10 herein.

The reaction chamber(s) of the reactor of this invention may further comprise one or more inlet and outlet channels. Such channels may be useful, e.g., for adding a new reagent at the proper step in a staged reaction or for diverting from the reaction chamber a portion of the reagent, a separated stream or the single multicomponent fluid stream formed in the first mixing zone.

In preferred embodiments, the reactor of this invention is composed of at least one first end-plate and at least one second end-plate, wherein the reactor plate or stack of reactor plates are disposed between the first and second end-plates. The end-plates function in part to confine the flow of fluid within the reactor. The first end-plate(s), which is generally situated on a front facial surface of a reactor plate (e.g., the top reactor plate in a stack of reactor plates), may function in part as an inlet distribution plate through which the component fluid streams and the heat exchange fluid(s) are introduced into the reactor of this invention. The first end-plate(s), as well as the second end-plate(s), which is generally disposed on a back facial surface of a reactor plate (e.g., the bottom reactor plate in a vertical stack of reactor plates) may also function in part as heat exchange fluid-distribution plates, wherein each end-plate contains a manifold channel for transporting the heat exchange fluid from one series of reaction chambers to another series of reaction chambers. Thus, the first end-plate(s) preferably contains at least one first inlet-port for the at least one heat exchange fluid and a plurality of second inlet-ports for the mutually separated fluid component streams; and the second end-plate(s) preferably contains at least one outlet-port or at least one flow-transfer channel for the at least one heat exchange fluid. Thus, in the method of this invention, the at least one heat exchange fluid is preferably introduced into the reactor by passing the heat exchange fluid(s) through the first inlet-port(s) and through the outlet-port(s) or the flow-transfer channel(s), while the mutually separated fluid component streams are passed through the second inlet-ports.

The end-plates are preferably removable from the reactor plates on which the end-plates are disposed.

The end-plates can be composed of any material which allows the plates to perform their purposes as stated hereinabove. The end-plates can be made of the same material as is found in the reactor plates.

In the reactor of this invention, the reaction chamber(s) preferably has an X-shaped configuration such as illustrated, e.g. in FIGS. 1–10 herein, or a T-shaped configuration such as illustrated, e.g., in FIGS. 11–15 herein. The flow-separation chamber(s) preferably has an oblong-shaped configuration or a T-shaped configuration, both of these configurations being shown in FIGS. 11–15 herein.

In addition to the reactor plate(s) and the end-plates, the reactor of this invention may further contain one or more distribution flow plates which function to distribute flow of the streams to be reacted, the reacted or partially reacted stream(s), and the heat exchange fluid(s) from one reactor plate to another reactor plate and/or from an end-plate to a reactor plate and/or from a reactor plate to an end-plate.

The reactor plates used in the reactor of this invention are preferably thin, with each plate preferably having a thickness of from about 0.001 inch to about 1.0 inch, more preferably from about 0.01 inch to about 0.25 inch, and most preferably from about 0.01 inch to about 0.10 inch.

Each reaction chamber formed in the reactor plate(s) preferably has a depth of from about 10% to about 80%, more preferably from about 30% to about 70%, of the depth of the reactor plate on which the reaction chamber is formed.

The reactor plate(s) are preferably composed of a thermally conductive material, more preferably metal. Suitable metals include, e.g., stainless steel, aluminum, aluminum-based alloys, nickel, iron, copper, copper-based alloys, mild steel, brass, titanium and other micromachinable metals.

The plates may have any suitable shape. For example, the plates can be square, rectangular, round and the like.

The reaction chamber(s) and, if present, the flow-separation chamber(s) are preferably formed by means of a micromachining process. Non-limiting examples of suitable micromachining processes include etching, stamping, punching, pressing, cutting, molding, milling, lithographing, and particle blasting. Most preferably, the micromachining process is an etching process. Etching, e.g., photochemical etching, provides precisely formed cavities and channels while being less expensive than many other conventional machining processes. Furthermore, etched perforations generally do not have the sharp corners, burrs, and sheet distortions associated with mechanical perforations. Etching processes are well known in the art and are typically carried out by contacting a surface with a conventional etchant.

When the reactor is composed of a stack of reactor plates, the reactor plates are preferably joined to one another to form a rigid structure. The plates may be removably held together and made leakproof by means of pressure, bolts, rivets, clamps, and the like; or the plates may be laminated, bonded, glued, soldered, or brazed together to form a composite. Preferably, the individual reactor plates are removably attached to one another to facilitate cleaning, inspection and re-use of the plates.

As mentioned hereinabove, the present invention is further directed to a method of reacting two or more fluid component streams by means of the reactor of this invention. The method of this invention generally involves: directing a plurality of mutually separated fluid component streams into the plurality of inlet means in the reaction chamber(s) and through the reactor from the plurality of inlet means in the reaction chamber(s) through the at least one outlet means of the reaction chamber(s), while directing at least one heat exchange fluid through the section of the at least one heat exchange channel.

Preferably, the heat exchange fluid(s) is directed into the reactor through one or more first heat-exchange ports formed in the first end-plate(s) and, more preferably, through one or more heat-exchange ports formed in a distribution plate disposed upstream of a first reactor plate in the reactor. The heat exchange fluid(s) can be directed out of the reactor by means of one or more second heat-exchange ports formed in the first or second end-plate(s).

The mutually separated fluid component streams are preferably introduced into the reactor through the component-inlet ports formed in the first end-plate(s). The fluid component streams may also be passed through component-ports formed in one or more distribution plates disposed upstream of the reactor plates or disposed between reactor plates.

The fluid component streams are preferably directed into the inlet means of the reaction chamber(s) in the primary direction. In addition, if one or more flow-separation chambers are used, the single multicomponent fluid stream is preferably directed in the primary direction into the inlet means of the flow-separation chamber(s).

The number of reaction chambers and flow-separation chambers (if used) and the number of reactor plates used in the reactor and the number of times the method of this invention can be repeated will depend at least in part on the number of reaction chambers required to achieve sufficient mixing of the components so as to form the desired reaction product or products in the desired concentration or concentrations. The sufficiency of mixing, in turn, will depend at least in part on the design of the reaction chambers themselves.

The reactor and method of this invention can be more fully described by reference to FIGS. 1–15 herein.

FIGS. 1–10 represent one embodiment of a reactor within the scope of this invention, wherein the reactor is composed of X-shaped reaction chambers.

In FIGS. 1–10, reactor 4 contains distribution flow-plates 12 and 24; reaction-chamber reactor plates 14, 16, 18, 20, and 22; and first and second end-plates E1 and E2. Flow-plates 12–24 are stacked adjacent to one another in a front-to-back facial configuration and sandwiched between the first and second end-plates.

FIGS. 1–10 illustrate, in part, how end-plates E1 and E2 can circulate a heat exchange fluid through reactor 4, and thus provide multiple opportunities for heat exchange between the heating or cooling fluid and the component fluid streams as the reaction stages proceed. The design of the end-plates can be varied to connect the vertical heat exchange channel sections 78a–78d in any desired manner. Thus, the heat exchange fluid can be delivered to any part of the reactor. If two or more heat exchange fluids are used, each can have a different temperature and can be delivered to a different part of the reactor. In this way, the temperature of each stage of the reaction can be independently and precisely controlled.

Reactor plates 14, 16, 18, 20 and 22 contain a series of X-shaped reaction chambers for reacting two or more components. Each reaction chamber contains two inlet-lobes for receiving two mutually separated fluid component streams; a first mixing zone for combining the two fluid component streams to form a single at least partially reacted multicomponent fluid stream; a flow-splitting means for splitting the single at least partially reacted multicomponent fluid stream into two at least partially reacted multicomponent fluid substreams; and two outlet-lobes through which the two at least partially reacted multicomponent fluid substreams exit the reaction chamber. Disposed in the first mixing zone is a heat-exchange port which extends through the thickness of the reactor plate. Extending through the heat-exchange port is a section of a heat exchange channel 78. Heat exchange channel 78 forms a continuous passageway through reactor 4 and permits temperature control of the reaction taking place in the reactor. As the fluid component fluid streams undergo mixing in the first mixing zone, the streams can undergo heat exchange with a heat exchange fluid passing through the section of the heat exchange channel transversing the mixing zone. In addition, each reaction chamber in reactor 4 further contains a turbulence-inducing zone disposed upstream of and in fluid communication with the mixing zone. The turbulence-inducing zone in each reaction chamber is adapted to induce turbulence in the separated streams as the streams enter the first mixing zone. As a result, the streams undergo turbulent (and, therefore, more thorough) mixing in the first mixing zone of the reaction chamber.

End-plate E1 and distribution flow plate 12 each contain a pair of inlet-ports for directing mutually separated fluid component streams to a first reaction chamber formed in first reactor plate 14. In addition, end-plate E1 and distribution flow 12 each contain heat exchange ports 80 and 82 (end-plate E1) and heat exchange ports 12a, 12b, 12c and 12d (distribution flow plate 12) for directing a heat exchange fluid through heat exchange channel 78. Distribution flow-plates 12 and 24 each contain two separate distribution flow-channels which are adapted to receive component-fluid flow from one vertical series of reaction chambers and to direct the flow of the fluid to a second vertical series of reaction chambers. Distribution flow plate 24 also contains heat exchange ports 24a, 24b, 24c and 24d.

Preferably, as mentioned hereinabove, heat exchange channel 78 passes through each reaction chamber, and, more preferably, through each first mixing zone in each reaction chamber. In this way, the temperature at which the components undergo mixing in the reactor can be more precisely controlled. Also preferably, heat exchange channel 78 further contains an external recirculation channel-section represented by Arrow "H" in FIG. 1. The recirculation channel-section, which is disposed between and in fluid communication with a heat-exchange outlet-port 82 and a heat-exchange inlet-port 80 (both of these ports being formed in end-plate E1), permits recirculation of a heat exchange fluid (not shown) passing through heat exchange channel 78 in reactor 4.

Heat exchange channel 78 as shown in FIG. 1 is made up of four vertical channel-sections 78a–78d and three horizontal channel-sections 78e–78g. Horizontal channel-section 78e, which is formed in facial surface 100I of second end-plate E2, extends between vertical channel-sections 78a and 78b. Thus, heat exchange fluid H passes through vertical channel-section 78a and enters inlet-side 84 of horizontal channel-section 78e. Fluid H flows to outlet-side 86 of channel-section 78e, where the heat exchange fluid then flows into vertical channel-section 78b. Fluid H then flows into inlet-side 88 of a second horizontal channel-section 78f, formed in facial surface 100A of first end-plate E1. The fluid then flows to outlet-side 90 of channel-section 78f and from there enters vertical channel-section 78c. Fluid H is then passed through channel-section 78c to a third horizontal channel-section 78g, formed in second end-plate E2, where the fluid enters channel-section 78g at inlet-side 92 and exits at outlet-side 94. From outlet-side 94 of channel-section 78g, fluid H then flows through vertical channel-section 78d to exit the reactor via outlet-port 82. Preferably, the heat exchange fluid is then recirculated back into reactor 4 by means of an external channel, discussed hereinabove, which is disposed between outlet-port 82 and inlet-port 80.

Reaction between two or more components may be carried out in reactor 4 as follows.

A heat exchange fluid H is passed through heat exchange channel 78. A first fluid stream (not shown) composed of at least one component and a second fluid stream "B" composed of at least one component are directed through respective throughway-ports 96 and 98 formed in end-plate E1 and respective throughway-ports 102 and 104 formed in plate 12 to respective inlet-lobes 26a and 26b of a reaction chamber 26 formed on a front facial surface 100C of plate 14. Reaction chamber 26 is composed of a turbulence-inducing zone 26c (shown in dashed lines); a first mixing zone 26d (shown in dotted lines); a heat exchange port 14a through which a section of heat exchange channel 78 is passed, port 14a being disposed in first mixing zone 26d; a flow-splitting member 26e; two outlet-lobes 26f and 26g; and two outlet-ports 108 and 110.

In reaction chamber 26, the first and second fluid streams are passed from inlet-lobes 26a and 26b through turbulence-inducing zone 26c and first mixing zone 26d, where the streams undergo turbulent mixing to form a first at least partially reacted multicomponent stream (not shown). While the first and second streams undergo turbulent mixing in first mixing zone 26d, the streams are disposed in a heat exchange relationship with fluid H as the heat exchange fluid flows through the section of heat exchange channel 78 extending through port 14a in first mixing zone 26d. The first at least partially reacted multicomponent stream is then directed to flow-splitting member 26e which splits the stream into first and second at least partially reacted multicomponent substreams (not shown). The first and second substreams are then directed to respective outlet-lobes 26f and 26g, where the substreams exit chamber 26 via respective outlet-ports 108 and 110.

The first and second substreams flow through respective outlet-ports 108 and 110 to respective inlet-lobes 34b and 34a of a reaction chamber 34 formed in a front facial surface 100D of plate 16. The first and second substreams are then passed through a turbulence-inducing zone 34c (shown in dashed lines) and a first mixing zone 34d (shown in dotted line), where the streams undergo turbulent mixing to form a second at least partially reacted multicomponent stream (not shown). While the first and second substreams undergo turbulent mixing in first mixing zone 34d, the streams are disposed in a heat exchange relationship with fluid H as the heat exchange fluid flows through the section of heat exchange channel 78 extending through a heat exchange port 16a disposed in the first mixing zone 34d. The second at least partially reacted multicomponent stream is then directed to a flow-splitting member 34e which splits the stream into third and fourth at least partially reacted multicomponent substreams (not shown). The third and fourth substreams are then directed to respective outlet-lobes 34g and 34f, where the substreams exit chamber 34 via respective outlet-ports 116 and 114.

The third and fourth substreams flow through respective outlet-ports 116 and 114 to respective inlet-lobes 42a and 42b of a reaction chamber 42 formed in a front facial surface 100E of plate 18. The third and fourth substreams are passed from respective inlet-lobes 42a and 42b through a turbulence-inducing zone 42c (shown in dashed lines) and a first mixing zone 42d (shown in dotted lines), where the streams undergo turbulent mixing to form a third at least partially reacted multicomponent stream (not shown). While the third and fourth substreams undergo turbulent mixing in first mixing zone 42d, the streams are disposed in a heat exchange relationship with fluid H as the heat exchange fluid flows through the section of heat exchange channel 78 extending through a heat exchange port 18a formed in first mixing zone 42d. The third at least partially reacted multicomponent stream is then directed to a flow-splitting member 42e which splits the stream into fifth and sixth at least partially reacted multicomponent substreams (not shown). The fifth and sixth substreams are then directed to respective outlet-lobes 42f and 42g, where the substreams exit chamber 42 via respective outlet-ports 120 and 122.

The fifth and sixth substreams flow through respective outlet-ports 120 and 122 to respective inlet-lobes 50b and 50a of a reaction chamber 50 formed in a front facial surface 100F of plate 20. The fifth and sixth substreams are passed from respective inlet-lobes 50b and 50a through a turbulence-inducing zone 50c (shown in dashed lines) and a first mixing zone 50d (shown in dotted lines), where the streams undergo turbulent mixing to form a fourth at least partially reacted multicomponent stream (not shown). While the fifth and sixth substreams undergo turbulent mixing in first mixing zone 50d, the streams are disposed in a heat exchange relationship with fluid H as the heat exchange fluid flows through the section of heat exchange channel 78 extending through a heat exchange port 20a disposed in first mixing zone 50d. The fourth at least partially reacted multicomponent stream is then directed to a flow-splitting member 50e which splits the stream into seventh and eighth at least partially reacted multicomponent substreams (not shown). The seventh and eighth substreams are then directed to respective outlet-lobes 50g and 50f, where the substreams exit chamber 50 via respective outlet-ports 128 and 126.

The seventh and eighth substreams flow through respective outlet-ports 126 and 128 to respective inlet-lobes 58a and 58b of a reaction chamber 58 formed in a front facial surface 100G of plate 22. The seventh and eighth substreams are passed from respective inlet-lobes 58a and 58b through a turbulence-inducing zone 58c (shown in dashed lines) and a first mixing zone 58d (shown in dotted lines), where the streams undergo turbulent mixing to form a fifth at least partially reacted multicomponent stream (not shown). While the seventh and eighth substreams undergo turbulent mixing in first mixing zone 58d, the streams are disposed in a heat exchange relationship with fluid H as the heat exchange fluid flows through the section of heat exchange channel 78 extending through a heat exchange port 22a formed in first mixing zone 58d. The fifth at least partially reacted multicomponent stream is then directed to a flow-splitting member 58e which splits the stream into ninth and tenth at least partially reacted multicomponent substreams (not shown), which are then directed to respective outlet-lobes 58f and 58g, where the substreams exit chamber 58 via respective outlet-ports 132 and 134.

From outlet-port 132, the ninth substream flows to inlet-side 72a of a flow chamber 72 formed in a front facial surface 100H of plate 24. From outlet-port 134, the tenth substream flows to inlet-side-port 70a of a flow chamber 70 formed in surface 100H of plate 24. From inlet-sides 72a and 70a, the ninth and tenth substreams are respectfully directed to outlet-sides 72b and 70b of flow chambers 72 and 70.

From outlet-sides 72b and 70b, the ninth and tenth substreams are respectively directed through inlet-ports 142 and 140 in plate 22 to respective inlet-lobes 60b and 60a of a reaction chamber 60 formed in surface 100G of plate 22. The ninth and tenth substreams are passed from respective inlet-lobes 60b and 60a through a turbulence-inducing zone 60c (shown in dashed lines) and a first mixing zone 60d (shown in dotted lines), where the streams undergo turbulent mixing to form a sixth at least partially reacted multicomponent stream (not shown). While the ninth and tenth substreams undergo turbulent mixing in first mixing zone 60d, the streams are disposed in a heat exchange relationship with fluid H as the heat exchange fluid flows through the section of heat exchange channel 78 extending through a heat exchange port 22b disposed in first mixing zone 60d. The sixth at least partially reacted multicomponent stream is then directed to a flow-splitting member 60e which splits the stream into eleventh and twelfth at least partially reacted multicomponent substreams (not shown), which are then directed to respective outlet-lobes 60g and 60f.

From respective outlet-lobes 60g and 60f, the eleventh and twelfth substreams are directed through respective inlet-ports 146 and 148 formed in plate 20 to respective inlet-lobes 52a and 52b of a reaction chamber 52 formed in surface 100F of plate 20. The eleventh and twelfth substreams are passed from respective inlet-lobes 52a and 52b through a turbulence-inducing zone 52c (shown in dashed lines) and a first mixing zone 52d (shown in dotted lines), where the streams undergo turbulent mixing to form a seventh at least partially reacted multicomponent stream (not shown). While the eleventh and twelfth substreams undergo turbulent mixing in first mixing zone 52d, the streams are disposed in a heat exchange relationship with fluid H as the heat exchange fluid flows through the section of heat exchange channel 78 extending through a heat exchange port 20b disposed in first mixing zone 52d. The seventh at least partially reacted multicomponent stream is then directed to a flow-splitting member 52e which splits the stream into thirteenth and fourteenth at least partially reacted multicomponent substreams (not shown), which are then directed to respective outlet-lobes 52f and 52g.

From respective outlet-lobes 52f and 52g, the thirteenth and fourteenth substreams are directed through respective inlet-ports 154 and 152 formed in plate 18 to respective inlet-lobes 44b and 44a of a reaction chamber 44 formed in surface 100E of plate 18. The thirteenth and fourteenth substreams are passed from respective inlet-lobes 44b and 44a through a turbulence-inducing zone 44c (shown in dashed lines) and a first mixing zone 44d (shown in dotted lines), where the streams undergo turbulent mixing to form an eighth at least partially reacted multicomponent stream (not shown). While the thirteenth and fourteenth substreams undergo turbulent mixing in first mixing zone 44d, the streams are disposed in a heat exchange relationship with fluid H as the heat exchange fluid flows through the section of heat exchange channel 78 extending through a heat exchange port 18b formed in first mixing zone 44d. The eighth at least partially reacted multicomponent stream is then directed to a flow-splitting member 44e which splits the stream into fifteenth and sixteenth at least partially reacted multicomponent substreams (not shown), which are then directed to respective outlet-lobes 44g and 44f.

From respective outlet-lobes 44g and 44f, the fifteenth and sixteenth substreams are directed through respective inlet-ports 158 and 160 formed in plate 16 to respective inlet-lobes 36a and 36b of a reaction chamber 36 formed in surface 100D of plate 16. The fifteenth and sixteenth substreams are passed from respective inlet-lobes 36a and 36b through a turbulence-inducing zone 36c (shown in dashed lines) and a first mixing zone 36d (shown in dotted lines), where the streams undergo turbulent mixing to form a ninth at least partially reacted multicomponent stream (not shown). While the fifteenth and sixteenth substreams undergo turbulent mixing in first mixing zone 36d, the streams are disposed in a heat exchange relationship with fluid H as the heat exchange fluid flows through the section of heat exchange channel 78 extending through a heat exchange port 16b formed in first mixing zone 36d. The ninth at least partially reacted multicomponent stream is then directed to a flow-splitting member 36e which splits the stream into seventeenth and eighteenth at least partially reacted multicomponent substreams (not shown), which are then directed to respective outlet-lobes 36f and 36g.

From respective outlet-lobes 36f and 36g, the fifteenth and sixteenth substreams are directed through respective inlet-ports 166 and 164 formed in plate 14 to respective inlet-lobes 28b and 28a of a reaction chamber 28 formed in surface 100C of plate 14. The seventeenth and eighteenth substreams are passed from respective inlet-lobes 28b and 28a through a turbulence-inducing zone 28c (shown in dashed lines) and a first mixing zone 28d (shown in dotted lines), where the streams undergo turbulent mixing to form a tenth at least partially reacted multicomponent stream (not shown). While the seventeenth and eighteenth substreams undergo turbulent mixing in first mixing zone 28d, the streams are disposed in a heat exchange relationship with fluid H as the heat exchange fluid flows through the section of heat exchange channel 78 extending through a heat exchange port 14b formed in first mixing zone 28d. The tenth at least partially reacted multicomponent stream is then directed to a flow-splitting member 28e which splits the stream into nineteenth and twentieth at least partially reacted multicomponent substreams (not shown), which are then directed to respective outlet-lobes 28g and 28f.

From respective outlet-lobes 28g and 28f, the nineteenth and twentieth substreams are directed to respective inlet-sides 66a and 68a of flow chambers 66 and 68 formed in surface 100B of plate 12. From inlet-sides 66a and 68a, the nineteenth and twentieth substreams flow to respective outlet-sides 66b and 68b of flow chambers 66 and 68.

From respective outlet-sides 66b and 68b, the nineteenth and twentieth substreams flow to respective inlet-lobes 30a and 30b of a reaction chamber 30 formed in surface 100C of plate 14. The nineteenth and twentieth substreams are passed from respective inlet-lobes 30a and 30b through a turbulence-inducing zone 30c and a first mixing zone 30d, where the streams undergo turbulent mixing to form an eleventh at least partially reacted multicomponent stream (not shown). While the nineteenth and twentieth substreams undergo turbulent mixing in first mixing zone 30d, the streams are disposed in a heat exchange relationship with fluid H as the heat exchange fluid flows through the section of heat exchange channel 78 extending through a heat exchange port 14c formed in first mixing zone 30d. The eleventh at least partially reacted multicomponent stream is then directed to a flow-splitting member 30e which splits the stream into twenty-first and twenty-second at least partially reacted multicomponent substreams (not shown), which are then directed to respective outlet-lobes 30f and 30g, where the streams exit chamber 30 via respective outlet-ports 168 and 170.

Through respective outlet-ports 168 and 170, the twenty-first and twenty-second substreams are directed to respective inlet-lobes 38b and 38a of a reaction chamber 38 formed in surface 100D of plate 16. The twenty-first and twenty-second substreams are passed from respective inlet-lobes 38b and 38a through a turbulence-inducing zone 38c (shown in dashed lines) and a first mixing zone 38d (shown in dotted lines), where the streams undergo turbulent mixing to form a twelfth at least partially reacted multicomponent stream (not shown). While the twenty-first and twenty-second substreams undergo turbulent mixing in first mixing zone 38d, the streams are disposed in a heat exchange relationship with fluid H as the heat exchange fluid flows through the section of heat exchange channel 78 extending through a heat exchange port 16c formed in first mixing zone 38d. The twelfth at least partially reacted multicomponent stream is then directed to a flow-splitting member 38e which splits the stream into twenty-third and twenty-fourth at least partially reacted multicomponent substreams (not shown), which are then directed to respective outlet-lobes 38g and 38f.

Through respective outlet-ports 172 and 174, the twenty-third and twenty-fourth substreams are directed to respective inlet-lobes 46a and 46b of a reaction chamber 46 formed in surface 100E of plate 18. The twenty-third and twenty-fourth substreams are passed from respective inlet-lobes 46a and 46b through a turbulence-inducing zone 46c (shown in dashed lines) and a first mixing zone 46d (shown in dotted lines), where the streams undergo turbulent mixing to form a thirteenth at least partially reacted multicomponent stream (not shown). While the twenty-third and twenty-fourth substreams undergo turbulent mixing in first mixing zone 46d, the streams are disposed in a heat exchange relationship with fluid H as the heat exchange fluid flows through the section of heat exchange channel 78 extending through a heat exchange port 18c formed in first mixing zone 46d. The thirteenth at least partially reacted multicomponent stream is then directed to a flow-splitting member 46e which splits the stream into twenty-fifth and twenty-sixth at least partially reacted multicomponent substreams (not shown), which are then directed to respective outlet-lobes 46f and 46g.

Through respective outlet-ports 178 and 180, the twenty-fifth and twenty-sixth substreams are directed to respective inlet-lobes 54b and 54a of a reaction chamber 54 formed in surface 100F of plate 20. The twenty-fifth and twenty-sixth substreams are passed from respective inlet-lobes 54b and 54a through a turbulence-inducing zone 54c (shown in dashed lines) and a first mixing zone 54d (shown in dotted lines), where the streams undergo turbulent mixing to form a fourteenth at least partially reacted multicomponent stream (not shown). While the twenty-fifth and twenty-sixth substreams undergo turbulent mixing in first mixing zone 54d, the streams are disposed in a heat exchange relationship with fluid H as the heat exchange fluid flows through the section of heat exchange channel 78 extending through heat exchange port 20c disposed in first mixing zone 54d. The fourteenth at least partially reacted multicomponent stream is then directed to a flow-splitting member 54e which splits the stream into twenty-seventh and twenty-eighth at least partially reacted multicomponent substreams (not shown), which are then directed to respective outlet-lobes 54g and 54f.

Through respective outlet-ports 186 and 184, the twenty-seventh and twenty-eighth substreams are directed to respective inlet-lobes 62a and 62b of a reaction chamber 62 formed in surface 100G of plate 22. The twenty-seventh and twenty-eighth substreams are passed from respective inlet-lobes 62a and 62b through a turbulence-inducing zone 62c (shown in dashed lines) and a first mixing zone 62d (shown in dotted lines), where the streams undergo turbulent mixing to form a fifteenth at least partially reacted multicomponent stream (not shown). While the twenty-seventh and twenty-eighth substreams undergo turbulent mixing in first mixing zone 62d, the streams are disposed in a heat exchange relationship with fluid H as the heat exchange fluid flows through the section of heat exchange channel 78 extending through a heat exchange port 22c formed in first mixing zone 62d. The fifteenth at least partially reacted multicomponent stream is then directed to a flow-splitting member 62e which splits the stream into twenty-ninth and thirtieth at least partially reacted multicomponent substreams (not shown), which are then directed to respective outlet-lobes 62f and 62g.

From respective outlet-ports 190 and 192, the twenty-ninth and thirtieth substreams flow to inlet-sides 76a and 74a of respective flow chambers 76 and 74 formed in surface 100H of plate 24. From inlet-sides 76a and 74a, the substreams flow to respective outlet-sides 76b and 74b in chambers 76 and 74, and from these outlet-sides, the substreams are directed through inlet-ports 198 and 196 formed in plate 22 to respective inlet-lobes 64b and 64a of a reaction chamber 64 formed in surface 100G of plate 22. The twenty-ninth and thirtieth substreams are passed from respective inlet-lobes 64b and 64a through a turbulence-inducing zone 64c (shown in dashed lines) and a first mixing zone 64d (shown in dotted lines), where the streams undergo turbulent mixing to form a sixteenth at least partially reacted multicomponent stream (not shown). While the twenty-ninth and thirtieth substreams undergo turbulent mixing in first mixing zone 64d, the streams are disposed in a heat exchange relationship with fluid H as the heat exchange fluid flows through the section of heat exchange channel 78 extending through a heat exchange port 22d disposed in first mixing zone 64d. The sixteenth at least partially reacted multicomponent stream is then directed to a flow-splitting member 64e which splits the stream into thirty-first and thirty-second at least partially reacted multicomponent substreams (not shown), which are then directed to respective outlet-lobes 64g and 64f.

The thirty-first and thirty-second substreams are directed from outlet-lobes 64g and 64f via inlet-ports 212 and 214 formed in plate 20 to respective inlet-lobes 56a and 56b of a reaction chamber 56 formed in surface 100F of plate 20. The thirty-first and thirty-second substreams are passed from respective inlet-lobes 56a and 56b through a turbulence-inducing zone 56c (shown in dashed lines) and a first mixing zone 56d (shown in dotted lines), where the streams undergo turbulent mixing to form a seventeenth at least partially reacted multicomponent stream (not shown). While the thirty-first and thirty-second substreams undergo turbulent mixing in first mixing zone 56d, the streams are disposed in a heat exchange relationship with fluid H as the heat exchange fluid flows through the section of heat exchange channel 78 extending through a heat exchange port 20d disposed in first mixing zone 56d. The seventeenth at least partially reacted multicomponent stream is then directed to a flow-splitting member 56e which splits the stream into thirty-third and thirty-fourth at least partially reacted multicomponent substreams (not shown), which are then directed to respective outlet-lobes 56f and 56g.

The thirty-third and thirty-fourth substreams are directed from outlet-lobes 56f and 56g via inlet-ports 220 and 218 formed in plate 18 to respective inlet-lobes 48b and 48a of a reaction chamber 48 formed in surface 100E of plate 18. The thirty-third and thirty-fourth substreams are passed from respective inlet-lobes 48b and 48a through a turbulence-inducing zone 48c (shown in dashed lines) and a first mixing zone 48d (shown in dotted lines), where the streams undergo turbulent mixing to form an eighteenth at least partially reacted multicomponent stream (not shown). While the thirty-third and thirty-fourth substreams undergo turbulent mixing in first mixing zone 48d, the streams are disposed in a heat exchange relationship with fluid H as the heat exchange fluid flows through the section of heat exchange channel 78 extending through a heat exchange port 18d disposed in the first mixing zone 48d. The eighteenth at least partially reacted multicomponent stream is then directed to a flow-splitting member 48e which splits the stream into thirty-fifth and thirty-sixth at least partially reacted multicomponent substreams (not shown), which are then directed to respective outlet-lobes 48g and 48f.

The thirty-fifth and thirty-sixth substreams are directed from outlet-lobes 48g and 48f via inlet-ports 224 and 226 formed in plate 16 to respective inlet-lobes 40a and 40b of a reaction chamber 40 formed in surface 100D of plate 16. The thirty-fifth and thirty-sixth substreams are passed from respective inlet-lobes 40a and 40b through a turbulence-inducing zone 40c (shown in dashed lines) and a first mixing zone 40d (shown in dashed lines), where the streams undergo turbulent mixing to form a nineteenth at least partially reacted multicomponent stream (not shown). While the thirty-fifth and thirty-sixth substreams undergo turbulent mixing in first mixing zone 40d, the streams are disposed in a heat exchange relationship with fluid H as the heat exchange fluid flows through the section of heat exchange channel 78 extending through a heat exchange port 16d disposed in first mixing zone 40d. The nineteenth at least partially reacted multicomponent stream is then directed to a flow-splitting member 40e which splits the stream into thirty-seventh and thirty-eighth at least partially reacted multicomponent substreams (not shown), which are then directed to respective outlet-lobes 40f and 40g.

The thirty-seventh and thirty-eighth substreams are directed from outlet-lobes 40f and 40g via inlet-ports 232 and 230 formed in plate 14 to respective inlet-lobes 32b and 32a of a reaction chamber 32 formed in surface 100C of plate 14. The thirty-seventh and thirty-eighth substreams are passed from respective inlet-lobes 32b and 32a through a turbulence-inducing zone 32c (shown in dashed lines) and a first mixing zone 32d (shown in dotted lines), where the streams undergo turbulent mixing to form a twentieth at least partially reacted multicomponent stream (not shown). While the thirty-seventh and thirty-eighth substreams undergo turbulent mixing in first mixing zone 32d, the streams are disposed in a heat exchange relationship with fluid H as the heat exchange fluid flows through the section of heat exchange channel 78 extending through a heat exchange port 14d formed in first mixing zone 32d. The twentieth at least partially reacted multicomponent stream is then directed to a flow-splitting member 32e which splits the stream into a thirty-ninth at least partially reacted multicomponent substream (not shown) and a fortieth at least partially reacted multicomponent substream "S-40", which are then directed to respective outlet-lobes 32g and 32f.

The thirty-ninth and fortieth substreams are directed from outlet-lobes 32g and 32f via inlet-ports 236 and 238 formed in plate 12 to respective outlet-ports 242 and 244 formed in first end-plate E1. From outlet-ports 242 and 244, the thirty-ninth and fortieth substreams are directed out of reactor 4 and to a desired location.

FIG. 11 illustrates a stack of reactor plates which can be used in a second embodiment of the reactor of this invention. In reactor 300, the reaction chambers are in the shape of a "T".

FIGS. 12–15 each illustrate a reactor plate which can be used in the second embodiment of the reactor.

Plate stack 300 is composed of distribution flow plate 302, and reaction-chamber reactor plates 304 and 308, and flow-separation reactor plate 306.

Plates 304 and 308 each contain a plurality of reaction chambers. Plate 302 (having facial surface 302A shown in FIG. 12a) contains ports for directing fluid streams to plate 304. Plate 306 contains a plurality of flow-separation chambers.

Although not shown in FIGS. 12–15, a heat exchange channel would preferably pass through through-holes formed in the first mixing zones of the reaction chambers shown in these figures.

Two component fluid streams may be directed through reactor 300 as follows. First and second fluid streams (not shown), each containing at least one component, may be introduced into reactor 300 via respective inlet-ports 310 and 312 formed in plate 302. Through inlet-ports 310 and 312, the streams are then passed to respective inlet-ends 318a and 318b of a reaction chamber 318 (shown in FIG. 13b and composed of 318a–318e) formed in a front facial surface 304A of plate 304. The streams are then combined at a first mixing zone 318c of chamber 318 to form a first multicomponent stream (not shown), which is then passed through flow-channel 318d to outlet-end 318e, where the first multicomponent stream exits chamber 318 via out-let-port 320.

Through outlet-port 320, the first multicomponent stream is directed to a flow-splitting region 322a of flow-separation chamber 322 formed in a front facial surface 306A of plate 306. The first multicomponent stream is split at region 322a into first and second multicomponent substreams (not shown), which are then directed to respective outlet-ends 322b and 322c, where the first and second substreams exit chamber 322 via respective outlet-ports 324 and 326.

Through outlet-ports 324 and 326, the first and second substreams are directed to respective inlet-ends 330a and 330b of a reaction chamber 330 formed in a front facial surface 308A of plate 308. The streams are then combined at first mixing zone 330c of chamber 330 to form a second multicomponent stream (not shown), which is then passed through flow-channel 330d to outlet-end 330e.

Through inlet-port 332 formed in plate 306, the second multicomponent stream is directed to flow-splitting region 334c of a reaction chamber 334 formed in surface 306A of plate 306. The stream is split at region 334c into third and fourth multicomponent substreams (not shown), which are then directed to respective outlet-ends 334a and 334b. The third and fourth substreams are directed through respective inlet-ports 338 and 340 formed in plate 304 to respective inlet-ends 336a and 336b of a reaction chamber 336 (shown in FIG. 13b and composed of 336a–336e) formed in surface 304A of plate 304. The third and fourth substreams are then combined at first mixing zone 336c to form a third multicomponent stream (not shown), which is then directed through flow-channel 336d to outlet-end 336e of chamber 336. The third multicomponent stream exits chamber 336 via outlet-port 342 formed in outlet-end 336e.

Through outlet-port 342, the third multicomponent stream flows into flow-splitting region 346a of a flow-separation chamber 346 formed in surface 306A of plate 306. The third multicomponent stream is split at region 346a into fifth and sixth multicomponent substreams (not shown), which are then directed to respective outlet-ends 346b and 346c of chamber 346. The fifth and sixth substreams exit chamber 346 via respective outlet-ports 348 and 350 formed in outlet-ends 346b and 346c.

Through outlet-ports 348 and 350, the fifth and sixth substreams are directed into respective inlet-ends 354a and 354b of a reaction chamber 354 formed in surface 308A of plate 308. The substreams are then combined at first mixing zone 354c to form a fourth multicomponent stream (not shown), which is then directed through flow-channel 354d to outlet-end 354e of chamber 354.

From outlet-end 354e, the fourth multicomponent stream is directed through inlet-port 358 formed in plate 306 to a flow-splitting region 360c of a reaction chamber 360 formed in surface 306A of plate 306. The fourth multicomponent stream is split at region 360c into seventh and eighth multicomponent substreams (not shown), which are then directed to respective outlet-ends 360a and 360b.

From respective outlet-ends 360a and 360b, the seventh and eighth substreams are directed through respective inlet-ports 366 and 368 formed in plate 304 to respective inlet-ends 370a and 370b of a reaction chamber 370 (shown in FIG. 13b and composed of 370a–e) formed in surface 304A of plate 304. The seventh and eighth substreams are combined at first mixing zone 370c of chamber 370 to form a fifth multicomponent stream (not shown), which is then directed through flow-channel 370d to outlet-end 370e. The fifth multicomponent stream exits chamber 370 via outlet-port 371 formed in outlet-end 370e.

Through outlet-port 371, the fifth multicomponent stream flows to flow-splitting region 372a of a flow-separation chamber composed of regions 372a–372c formed in surface 306A of plate 306. The fifth multicomponent stream is split at region 372a into ninth and tenth multicomponent substreams (not shown), which are then directed to respective outlet-ends 372b and 372c. The ninth and tenth substreams exit chamber 372 via respective outlet-ports 374 and 376.

Through outlet-ports 374 and 376, the ninth and tenth substreams are directed to respective inlet-ends 378a and 378b of a reaction chamber 378 formed in surface 308A of plate 308. The ninth and tenth substreams are combined at first mixing zone 378c of chamber 378 to form a sixth multicomponent stream (not shown). The sixth multicomponent stream is then directed through flow-channel 378d to outlet-end 378e of chamber 378.

From outlet-end 378e, the sixth multicomponent stream is directed through inlet-port 380 formed in plate 306 to a flow-splitting region 382c of a reaction chamber 382 formed in surface 306A of plate 306. The sixth multicomponent stream is split at region 382c into eleventh and twelfth multicomponent substreams (not shown), which are then directed to respective outlet-ends 382a and 382b of chamber 382.

From outlet-ends 382a and 382b, the eleventh and twelfth substreams are directed through respective inlet-ports 384 and 386 formed in plate 304 to respective inlet-ends 388a and 388b of a reaction chamber 388 (shown in FIG. 13b and composed of 388a–388e) formed in surface 304A of plate 304. The eleventh and twelfth substreams are then combined at first mixing zone 388c of chamber 388 to form a seventh multicomponent stream (not shown). The seventh multicomponent stream is then directed through flow-channel 388d to outlet-end 388e, from which the stream exits chamber 388 via outlet-port 390.

Through outlet-port 390, the seventh multicomponent stream flows to flow-splitting region 394a of a flow-separation chamber 394 formed in surface 306A of plate 306. The seventh multicomponent stream is split at region 394a into thirteenth and fourteenth multicomponent fluid substreams (not shown), which are then directed to outlet-ends 394b and 394c of chamber 394. The thirteenth and fourteenth substreams exit chamber 394 via respective outlet-ports 396 and 398.

Through outlet-ports 396 and 398, the thirteenth and fourteenth substreams are directed into respective inlet-ends 402a and 402b of a reaction chamber 402 formed in surface 308A of plate 308. The substreams are combined at first mixing zone 402c of chamber 402 to form an eighth multicomponent stream (not shown). The eighth multicomponent stream is then directed through flow-channel 402d to outlet-end 402e of chamber 402.

From outlet-end 402e, the eighth multicomponent stream is directed through inlet-port 406 formed in plate 306 to a flow-splitting region 408c of a flow-separation chamber 408 formed in surface 306A of plate 306. The eighth multicomponent stream is split at region 408c into fifteenth and sixteenth multicomponent substreams (not shown), which are then directed to outlet-ends 408a and 408b, respectively.

From outlet-ends 408a and 408b, the fifteenth and sixteenth substreams are directed through respective inlet-ports 414 and 416 formed in plate 304 to respective inlet-ends 418a and 418b of a reaction chamber 418 (shown in FIG. 13b and composed of 418a–418e) formed in surface 304A of plate 304. The substreams are then combined at first mixing zone 418c of chamber 418 to form a ninth multicomponent stream (not shown). The ninth multicomponent stream is then directed through flow-channel 418d to outlet-end 418e of chamber 418.

From outlet-end 418e, the ninth multicomponent stream is directed through outlet-port 422 formed in plate 302. From outlet-port 422, the ninth multicomponent stream can be directed out of reactor 300 to a desired location.

Although the present invention has been described with reference to preferred embodiments, those skilled in the art will recognize that changes may be made in form and detail without departing from the spirit and scope of the invention.

What is claimed is:

1. A plate-type chemical reactor, comprising: one or more reactor plates including at least one reaction-chamber reactor plate; at least one reaction chamber formed on a front facial surface of said at least one reaction-chamber reactor plate; and at least one heat exchange channel passing through said at least one reaction-chamber reactor plate from said front facial surface to an opposite back facial surface of said reaction-chamber reactor plate, such that at least one section of said at least one heat exchange channel is disposed in a heat exchange relationship with said at least one reaction chamber; wherein said at least one reaction chamber comprises: a plurality of inlet means for receiving and directing a plurality of mutually separated fluid component streams, a first mixing zone for mixing said separated fluid component streams to form a single at least partially reacted multicomponent fluid stream thereof, and at least one outlet means.

2. A reactor according to claim 1, wherein said reactor further comprises at least one flow-splitting means disposed downstream of and in fluid communication with said first mixing zone, said at least one flow-splitting means being further disposed to split said single at least partially reacted multicomponent fluid stream into a plurality of at least partially reacted multicomponent fluid substreams.

3. A reactor according to claim 1, wherein each of said one or more reactor plates has a thickness ranging from about 0.001 inch to about 1.0 inch.

4. A reactor according to claim 1, wherein each of said one or more reactor plates is comprised of a thermally conductive material.

5. A reactor according to claim 1, wherein each of said at least one reaction chamber is an etched structure.

6. A reactor according to claim 1, wherein said section of said heat exchange channel is disposed in said heat exchange relationship with said first mixing zone.

7. A reactor according to claim 6, wherein said section of said heat exchange channel transverses said first mixing zone.

8. A reactor according to claim 1, wherein the reactor comprises a plurality of said one or more reactor plates, wherein said plurality of plates are stacked in a front-to-back facial configuration.

9. A reactor according to claim 8, further comprising at least one first end-plate and at least one second end-plate, wherein said plurality of reactor plates are disposed between said first and second end-plates.

10. A reactor according to claim 9, wherein said plurality of inlet means is disposed to receive said mutually separated fluid component streams in a primary direction and to direct said streams in directions substantially normal to said primary direction, wherein said primary direction is transverse to said front facial surface of said one or more reactor plates.

11. A reactor according to claim 10, wherein said reaction chamber further comprises a turbulence-inducing zone disposed downstream of and in fluid communication with said inlet means and upstream of and in fluid communication with said first mixing zone.

12. A reactor according to claim 10, wherein said at least one outlet means comprises a single outlet means for said single at least partially reacted multicomponent fluid stream.

13. A reactor according to claim 10, wherein said reactor further comprises at least one flow-splitting means for splitting said single at least partially reacted multicomponent fluid stream into a plurality of at least partially reacted multicomponent fluid substreams, wherein said at least one flow-splitting means is disposed downstream of and in fluid communication with said first mixing zone, said at least one flow-splitting means being further disposed to split said single at least partially reacted multicomponent fluid stream in directions substantially normal to said primary direction.

14. A reactor according to claim 13, wherein said at least one flow-splitting means is situated in said at least one reaction chamber, wherein said flow-splitting means is disposed downstream of and in fluid communication with said first mixing zone.

15. A reactor according to claim 14, wherein said at least one outlet means comprises a plurality of outlet means, each of said outlet means being disposed to receive one of said plurality of at least partially reacted multicomponent fluid substreams.

16. A reactor according to claim 15, wherein said at least one reaction chamber has an X shape.

17. A reactor according to claim 15, wherein said reactor comprises a plurality of said at least one reaction chamber, wherein said reaction chambers are serially joined.

18. A reactor according to claim 17, wherein said reactor comprises a plurality of said at least one reaction-chamber reactor plate.

19. A reactor according to claim 13, wherein said at least one flow-splitting means is disposed in at least one separate flow-separation chamber, wherein said at least one separate flow-separation chamber comprises: an inlet means disposed to receive said single at least partially reacted multicomponent fluid stream from said outlet means of said reaction chamber; said flow-splitting means, wherein said flow-splitting means is disposed to receive said single at least partially reacted multicomponent fluid stream from said inlet means of said flow-separation chamber and to split said single at least partially reacted multicomponent fluid stream into a plurality of at least partially reacted multicomponent fluid substreams; and a plurality of outlet means disposed to receive said plurality of at least partially reacted multicomponent fluid substreams from said flow-splitting means.

20. A reactor according to claim 19, wherein each of said at least one reaction chamber and each of said at least one flow-separation chamber is an etched structure.

21. A reactor according to claim 19, wherein said inlet means of said flow-separation chamber is disposed to receive said single at least partially reacted multicomponent fluid stream in said primary direction, further wherein said flow-splitting means of said flow-separation chamber is disposed to split said single at least partially reacted multicomponent fluid stream in directions substantially normal to said primary direction.

22. A reactor according to claim 21, wherein said reactor further comprises at least one flow-separation reactor plate, wherein said at least one flow-separation reactor plate has formed on a front facial surface thereof said at least one flow-separation chamber.

23. A reactor according to claim 22, wherein said reactor comprises a plurality of said at least one reaction chamber and a plurality of said at least one flow-separation chamber, wherein said reaction chambers and said flow-separation chambers are serially joined.

24. A reactor according to claim 19, wherein said at least one reaction chamber has a T shape.

25. A reactor according to claim 24, wherein said at least one flow-separation chamber has an oblong shape or a T shape.

26. A method of reacting two or more fluid component streams comprising the steps of:
   (1) providing a plate-type chemical reactor comprising: one or more reactor plates including at least one reaction-chamber reactor plate; at least one reaction chamber formed on a front facial surface of said at least one reaction-chamber reactor plate; and at least one heat exchange channel passing through said at least one reaction-chamber reactor plate from said front facial surface to an opposite back facial surface of said reaction-chamber reactor plate, such that at least one section of said at least one heat exchange channel is disposed in a heat exchange relationship with said at least one reaction chamber; said at least one reaction chamber comprising: a plurality of inlet means for receiving and directing a plurality of mutually separated fluid component streams, a first mixing zone for mixing said separated fluid component streams to form a single at least partially reacted multicomponent fluid stream thereof, and at least one outlet means; and
   (2) directing a plurality of mutually separated fluid component streams into said plurality of inlet means and through said reactor from said plurality of inlet means through said at least one outlet means, while directing at least one heat exchange fluid through said section of said at least one heat exchange channel.

27. A method according to claim 26, wherein said reactor further comprises at least one first end-plate and at least one second end-plate, wherein said plurality of reactor plates are disposed between said first and second end-plates, said at least one first end-plate comprising at least one first heat-exchange port for said at least one heat exchange fluid and a plurality of component-inlet ports for said mutually separated fluid component streams, said at least one second end-plate comprising at least one second heat-exchange port or at least one heat exchange flow-transfer channel for said at least one heat exchange fluid; wherein said method further comprises: directing said at least one heat exchange fluid through said at least one first heat-exchange port and through said at least one second heat-exchange port or said at least one heat exchange flow-transfer channel, while directing said mutually separated fluid component streams through said component-ports.

28. A method according to claim 26, wherein in said reactor said plurality of inlet means is disposed to receive said mutually separated fluid component streams in a primary direction and to direct said streams in directions substantially normal to said primary direction, wherein said primary direction is transverse to said front facial surface of said one or more reactor plates; wherein said method comprises directing said mutually separated fluid component streams through said plurality of inlet means in said primary direction.

29. A method according to claim 28, wherein said reaction chamber further comprises a turbulence-inducing zone disposed downstream of and in fluid communication with said inlet means and upstream of and in fluid communication with said first mixing zone; wherein said method comprises passing said mutually separated streams through said turbulence-inducing zone.

30. A method according to claim 26, wherein said reactor further comprises at least one flow-splitting means disposed downstream of and in fluid communication with said first mixing zone, said at least one flow-splitting means being further disposed to split said single at least partially reacted multicomponent fluid stream into a plurality of at least partially reacted multicomponent fluid substreams; wherein said method further comprises passing said single at least partially reacted multicomponent fluid stream through said at least one flow-splitting means to form said plurality of at least partially reacted multicomponent fluid substreams.

31. A method according to claim 30, wherein said reactor further comprises at least one flow-splitting means for splitting said single at least partially reacted multicomponent fluid stream into a plurality of at least partially reacted multicomponent fluid substreams, wherein said at least one flow-splitting means is disposed downstream of and in fluid communication with said first mixing zone, said at least one flow-splitting means being further disposed to split said single at least partially reacted multicomponent fluid stream in directions substantially normal to said primary direction; wherein said method further comprises directing in said primary direction said single at least partially reacted multicomponent fluid stream through said at least one flow-splitting means to form said plurality of at least partially reacted multicomponent fluid substreams.

32. A method according to claim 31, wherein said at least one flow-splitting means is disposed in at least one separate flow-separation chamber, wherein said at least one separate flow-separation chamber comprises: an inlet means disposed to receive said single at least partially reacted multicomponent fluid stream from said outlet means of said reaction chamber in a primary direction; said flow-splitting means, wherein said flow-splitting means is disposed to receive said single at least partially reacted multicomponent fluid stream from said inlet means of said flow-separation chamber and to split said single at least partially reacted multicomponent fluid stream into a plurality of at least partially reacted multicomponent fluid substreams in directions substantially normal to said primary direction; and a plurality of outlet means disposed to receive said plurality of at least partially reacted multicomponent fluid substreams from said flow-splitting means; wherein said method comprises directing said single at least partially reacted multicomponent fluid stream through said inlet means of said flow-separation chamber in said primary direction.

* * * * *